(12) United States Patent
Cai et al.

(10) Patent No.: US 12,267,132 B2
(45) Date of Patent: Apr. 1, 2025

(54) CHANNEL STATE INFORMATION REPORTING METHOD AND COMMUNICATIONS APPARATUS

(71) Applicant: HUAWEI TECHNOLOGIES CO., LTD., Guangdong (CN)

(72) Inventors: Shijie Cai, Beijing (CN); Xueru Li, Beijing (CN); Kunpeng Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 17/730,644

(22) Filed: Apr. 27, 2022

(65) Prior Publication Data

US 2022/0263560 A1    Aug. 18, 2022

Related U.S. Application Data

(63) Continuation of application No. PCT/CN2020/123556, filed on Oct. 26, 2020.

(30) Foreign Application Priority Data

Oct. 29, 2019    (CN) .......................... 201911037224.9

(51) Int. Cl.
    *H04B 7/06*    (2006.01)
(52) U.S. Cl.
    CPC .......... *H04B 7/0626* (2013.01); *H04B 7/0617* (2013.01); *H04B 7/0634* (2013.01)
(58) Field of Classification Search
    CPC .................................................. H04B 7/0626
    See application file for complete search history.

(56) References Cited

U.S. PATENT DOCUMENTS

2016/0182196 A1    6/2016    Lorca Hernando
2017/0164367 A1    6/2017    Manolakos et al.
(Continued)

FOREIGN PATENT DOCUMENTS

CN    103875202 A    6/2014
CN    108781201 A    11/2018
(Continued)

OTHER PUBLICATIONS

Ericsson, "On CSI reporting," 3GPP TSG-RAN WG1 NR Ad Hoc #3, R1-1716349, Nagoya, Japan, Sep. 18-21, 2017, 9 pages.
(Continued)

*Primary Examiner* — Guang W Li
(74) *Attorney, Agent, or Firm* — Fish & Richardson P.C.

(57) ABSTRACT

This application provides channel state information reporting methods and communications apparatuses. One method includes: generating first indication information and a plurality of groups of second indication information, where the first indication information indicates a plurality of frequency domain component vectors, each group in the plurality of groups of second indication information corresponds to a spatial layer and a plurality of spatial domain component vectors and constructs precoding vectors of the spatial layer in a plurality of frequency bands, and each piece of second indication information in each group corresponds to a spatial domain component vector in the plurality of spatial domain component vectors and indicates at least one of the plurality of frequency domain component vectors that corresponds to the spatial domain component vector; and sending the first indication information and the second indication information.

20 Claims, 8 Drawing Sheets

(56) References Cited

U.S. PATENT DOCUMENTS

| | | | | |
|---|---|---|---|---|
| 2017/0187441 | A1* | 6/2017 | Manolakos | H04B 7/0663 |
| 2018/0054290 | A1 | 2/2018 | Park et al. | |
| 2020/0322012 | A1* | 10/2020 | Wernersson | H04B 7/0478 |
| 2020/0322028 | A1* | 10/2020 | Tosato | H04B 7/0639 |
| 2021/0058119 | A1* | 2/2021 | Wang | H04B 7/0645 |
| 2021/0075482 | A1* | 3/2021 | Rahman | H04B 7/0469 |
| 2021/0143885 | A1* | 5/2021 | Gromann | H04B 7/0617 |

FOREIGN PATENT DOCUMENTS

| | | | |
|---|---|---|---|
| CN | 109474315 A | 3/2019 | |
| CN | 109802712 A | 5/2019 | |
| CN | 110086732 A | 8/2019 | |

OTHER PUBLICATIONS

Huawei, HiSilicon, "Discussion on UE complexity of DFT-based compression codebook," 3GPP TSG RAN WG1 Meeting #97, R1-1906032, Reno, USA, May 13-17, 2019, 6 pages.

Office Action issued in Chinese Application No. 201911037224.9 on Sep. 3, 2021, 7 pages (with English translation).

PCT International Search Report and Written Opinion issued in International Application No. PCT/CN2020/123556 on Jan. 8, 2021, 15 pages (with English translation).

Ericsson, "On CSI Enhancements for MU-MIMO," 3GPP TSG RAN WG1 Meeting RAN1 #98, R1-1909523, Prague, Czech Republic, Aug. 26-30, 2019, 28 pages.

Fraunhofer et al., "Enhancements on Type-II CSI Reporting", 3GPP TSG-RAN 1 #98, R1-1908935, Prague, Czech Republic, Aug. 26-30, 2019, 15 pages.

ZTE, "CSI Enhancement for MU-MIMO Support, " 3GPP TSG RAN WG1 Meeting #98, R1-1908190, Prague, Czech Republic, Aug. 26-30, 2019, 16 pages.

Extended European Search Report in European AppIn No. 20882315.3, dated Oct. 24, 2022, 11 pages.

\* cited by examiner

CHANNEL STATE INFORMATION REPORTING METHOD AND COMMUNICATIONS APPARATUS

CROSS-REFERENCE TO RELATED APPLICATIONS

This application is a continuation of International Application No. PCT/CN2020/123556, filed on Oct. 26, 2020, which claims priority to Chinese Patent Application No. 201911037224.9, filed on Oct. 29, 2019. The disclosures of the aforementioned applications are hereby incorporated by reference in their entireties.

TECHNICAL FIELD

Embodiments of this application relate to the communications field, and more specifically, to a channel state information reporting method and a communications apparatus.

BACKGROUND

In a massive multiple-input multiple-output (Massive MIMO) technology, a terminal device may report channel state information (CSI) to a network device, for example, in a manner such as channel measurement, so that the network device obtains a channel attribute of a communications link and uses a precoding technology to reduce interference between a plurality of users and interference between a plurality of signal streams of a same user, thereby improving signal quality, implementing spatial multiplexing, and improving spectrum utilization.

Reporting the CSI by the terminal device is also referred to as "feeding back the CSI by the terminal device". A feedback manner may include explicit feedback and implicit feedback. The explicit feedback means that the terminal device feeds back a channel matrix. The implicit feedback means that the terminal device feeds back a precoding matrix. Using the implicit feedback as an example, the terminal device may determine, through channel measurement, a precoding matrix adapted to a downlink channel, and expect, through feedback, that the network device obtains a precoding matrix the same as or similar to a precoding matrix determined by the terminal device. To reduce feedback overheads and improve feedback precision, in an implementation, the terminal device may indicate the precoding vector to the network device in a feedback manner combining spatial domain compression and frequency domain compression. Specifically, the terminal device may determine a precoding vector of each spatial layer in each frequency band based on channel measurement, and approximately indicate the determined precoding vector of each spatial layer by using a weighted sum of at least one spatial domain component vector and at least one frequency domain component vector. The terminal device may feedback, to the network device, spatial domain component vectors, frequency domain component vectors, and corresponding spatial-frequency combination coefficients that are selected to indicate the precoding vectors, so that the network device uses a weighted sum of matrices constructed by using the spatial domain component vectors and the frequency domain component vectors, to restore the precoding vector corresponding to each frequency band in each spatial layer and further determine a precoding matrix corresponding to each frequency band.

The terminal device feeds back the spatial-frequency combination coefficients to the network device, and generally reports positions of the spatial-frequency combination coefficients (for example, non-zero spatial-frequency combination coefficients or larger spatial-frequency combination coefficients) and values corresponding to the spatial-frequency combination coefficients. However, in the current CSI reporting method, relatively large indication overheads are needed for feeding back the positions of the spatial-frequency combination coefficients by the terminal device.

SUMMARY

Embodiments of this application provide a channel state information reporting method and a communications apparatus, to help reduce indication overheads for feeding back positions of spatial-frequency combination coefficients by a terminal device.

According to a first aspect, a channel state information reporting method is provided. The method may be performed by a terminal device, or may be performed by a component (such as a circuit or a chip) disposed in the terminal device. This is not limited in this application.

The method includes: generating first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and sending the first indication information and the second indication information.

In this embodiment of this application, the first indication information is used to indicate the plurality of frequency domain component vectors, and the plurality of groups of second indication information are used to indicate at least one of the plurality of frequency domain component vectors for each spatial domain component vector of each spatial layer, to indicate positions of spatial-frequency combination coefficients in a precoding matrix. This helps reduce indication overheads for feeding back the positions of the spatial-frequency combination coefficients by the terminal device and improve CSI feedback efficiency.

With reference to the first aspect, in some implementations of the first aspect, the plurality of frequency domain component vectors are continuous, the first indication information is used to indicate a start position $K_2$ of the plurality of frequency domain component vectors and a quantity $M_2$ of the plurality of frequency domain component vectors, $K_2$ is an integer greater than or equal to 0, and $M_2$ is an integer greater than or equal to 2.

The plurality of frequency domain component vectors are continuous. In this embodiment of this application, coverage of the plurality of frequency domain component vectors may also be referred to as a "large window". When feeding back the plurality of frequency domain component vectors, the terminal device may feed back a length of the large window and a start position of the large window. In other words, the start position and the quantity of the plurality of frequency domain component vectors are indicated by using the first indication information. The start position $K_2$ of the plurality of frequency domain component vectors may be understood as an index of a first frequency domain component vector in the plurality of frequency domain component vectors in a candidate frequency domain component vector sequence. Therefore, a value of $K_2$ may be 0 to $N_F-1$. In a possible implementation, because a quantity of candidate frequency domain component vectors is $N_F$, there are a total of $N_F$ possible cases for the start position, and a quantity of bits occupied to indicate the start position $K_2$ of the plurality of frequency domain component vectors is $\lceil \log_2 N_F \rceil$. A quantity of bits occupied to indicate the quantity $M_2$ of the plurality of frequency domain component vectors is $\lceil \log_2 X_2 \rceil$, and $X_2$ represents a quantity of candidate values of $M_2$. In summary, indication overheads of the first indication information are $\lceil \log_2 N_F \rceil + \lceil \log_2 X_2 \rceil$ bits.

With reference to the first aspect, in some implementations of the first aspect, in the first indication information, a quantity of bits occupied to indicate the start position of the plurality of frequency domain component vectors is $\lceil \log_2 M_2 \rceil$, and a frequency domain component vector corresponding to a strongest spatial-frequency component vector corresponding to each spatial layer is always a first frequency domain component vector in a candidate frequency domain component vector sequence.

The strongest spatial-frequency component vector is also referred to as a strongest spatial-frequency pair, and may be understood as a spatial-frequency combination coefficient with a largest amplitude value. It should be understood that the terminal device may shift, to a frequency domain vector of a fixed position (for example, the first frequency domain component vector, also referred to as a fixed index value, for example, an index value 0), a frequency domain component vector corresponding to a spatial-frequency combination coefficient whose amplitude value is the largest among $M^i$ frequency domain component vectors formed by a union set of $M_{i,j}$ frequency domain component vectors corresponding to each of $L_i$ spatial domain component vectors corresponding to an $i^{th}$ spatial layer, and a same cyclic shift is performed on indexes of other $M^i-1$ frequency domain component vectors sequentially. In this embodiment, among $M^i$ frequency domain component vectors corresponding to each spatial layer, a frequency domain component vector corresponding to the strongest spatial-frequency component vector is the first frequency domain component vector (the index value is 0) in the candidate frequency domain component vector sequence.

After the frequency domain component vector corresponding to the strongest spatial-frequency component vector corresponding to each spatial layer is shifted to the first frequency domain component vector in the candidate frequency domain component vector sequence, the terminal device may first determine the quantity $M_2$ of the plurality of frequency domain component vectors, and then select the start position of the plurality of frequency domain component vectors. The plurality of frequency domain component vectors selected by the terminal device needs to include the frequency domain component vector corresponding to the strongest spatial-frequency component vector (the first one located in the candidate frequency domain component vector sequence), and the quantity $M_2$ of the plurality of frequency domain component vectors is known. In this case, there are $M_2$ possible cases for the start position of the plurality of frequency domain component vectors, and the quantity of bits occupied to indicate the start position of the plurality of frequency domain component vectors is $\lceil \log_2 M_2 \rceil$. $M_2$ is less than $N_F$. Therefore, overheads for feeding back the start position of the plurality of frequency domain component vectors can be reduced by the shift.

With reference to the first aspect, in some implementations of the first aspect, if $K_2+M_2 \leq N_F$, indexes of the plurality of frequency domain component vectors are $K_2$ to $K_2+M_2-1$; or if $K_2+M_2 > N_F$, indexes of the plurality of frequency domain component vectors are $K_2$ to $N_F-1$ and 0 to $(K_2+M_2-1) \bmod N_F$, where $N_F$ is a quantity of candidate frequency domain component vectors, $N_F$ is an integer greater than or equal to 2, and the plurality of frequency domain component vectors are selected from the $N_F$ candidate frequency domain component vectors.

The plurality of continuous frequency domain component vectors in this embodiment of this application have a cyclic shift feature. To be specific, in the candidate frequency domain component vector sequence including the $N_F$ candidate frequency domain component vectors, if a length of a large window exceeds a tail of the sequence, a remaining length of the window covers ahead of the sequence. Using $N_F=10$ as an example (the indexes of the 10 candidate frequency domain component vectors are 0 to 9 sequentially), if the start position and the quantity of the plurality of continuous frequency domain component vectors are $K_2=3$ and $M_2=5$ respectively, indexes of five frequency domain component vectors corresponding to the length of the large window are 3 to 7 sequentially. If the start position and the quantity of the plurality of continuous frequency domain component vectors are $K_2=8$ and $M_2=5$ respectively, indexes of five frequency domain component vectors corresponding to the length of the large window are 8 to 9 and 0 to 2 sequentially. The foregoing cyclic feature can make the length of the large window as small as possible, so that fewer bits are used to indicate the start position and the window length of the large window, thereby reducing reporting overheads of the terminal device.

With reference to the first aspect, in some implementations of the first aspect, each piece of second indication information is used to indicate a plurality of groups of at least one continuous frequency domain component vector.

In this embodiment of this application, coverage of a group of at least one continuous frequency domain component vector is referred to as a "small window". One piece of second indication information may indicate a plurality of small windows. One piece of second indication information corresponds to one spatial domain component vector of one spatial layer. Therefore, one spatial domain component vector corresponds to a plurality of small windows, and frequency domain component vectors included in the plurality of small windows are frequency domain component vectors corresponding to the spatial domain component vector. As described above, the $i^{th}$ spatial layer corresponds to the $L_i$ spatial domain component vectors, and a $j^{th}$ one of the $L_i$ spatial domain component vectors corresponds to $M_{i,j}$ frequency domain component vectors. The $M_{i,j}$ frequency domain component vectors are all frequency domain component vectors included in a plurality of small windows indicated by second indication information corresponding to the $j^{th}$ spatial domain component vector. Because the plurality of small windows are selected from the plurality of frequency domain component vectors indicated by the first indication information, the small windows are all included in a large window, and one large window may include a plurality of small windows. In this embodiment of this application, indication overheads for feeding back the positions of the spatial-frequency combination coefficients by the terminal device are reduced by using a combination of large window reporting and small window reporting.

With reference to the first aspect, in some implementations of the first aspect, each piece of second indication information includes second position indication information and a plurality of pieces of second sub indication information, the second position indication information is used to indicate a plurality of start positions of the plurality of groups of at least one continuous frequency domain component vector, and each piece of second sub indication information in the plurality of pieces of second sub indication information is used to indicate a quantity of at least one continuous frequency domain component vector in each of the plurality of groups of at least one continuous frequency domain component vector.

It should be understood that the second position indication information indicates, by using one piece of indication information, a plurality of start positions of a plurality of groups of at least one continuous frequency domain component vector corresponding to one piece of second indication information. "The plurality of groups of at least one continuous frequency domain component vector" means that there are a plurality of groups of at least one continuous frequency domain component vector. For example, two continuous frequency domain component vectors are a first group, and five continuous frequency domain component vectors are a second group. Assuming that there are five groups of at least one continuous frequency domain component vector, the second position indication information indicates five start positions corresponding to the five groups of at least one continuous frequency domain component vector.

It should be understood that feedback in the foregoing manner is needed in each piece of second indication information in each group of second indication information. It should be further understood that at least one continuous frequency domain component vector corresponding to a small window in this embodiment of this application also has a "cyclic" feature. To be specific, in a large window including a start position $K_2$ and a window length $M_2$, if a length of the small window exceeds a tail of the large window, a remaining length of the small window covers a head of the large window.

With reference to the first aspect, in some implementations of the first aspect, the method further includes: generating third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and sending the third indication information and the plurality of pieces of fourth indication information.

With reference to the first aspect, in some implementations of the first aspect, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

The plurality of spatial domain component vectors are continuous. In this embodiment of this application, coverage of the plurality of spatial domain component vectors may also be referred to as a "large window". When feeding back the plurality of spatial domain component vectors, the terminal device may feedback a length of the large window and a start position of the large window. This is similar to feedback of the frequency domain component vectors. In other words, the start position and the quantity of the plurality of spatial domain component vectors are indicated by using the third indication information. The start position $K_1$ of the plurality of spatial domain component vectors may be understood as an index of a first spatial domain component vector in the plurality of spatial domain component vectors in a candidate spatial domain component vector sequence. Therefore, a value of $K_1$ may be 0 to $N_s$. In a possible implementation, because a quantity of candidate spatial domain component vectors is $N_s$, there are a total of $N_s$ possible cases for the start position, and a quantity of bits occupied to indicate the start position of the $M_1$ continuous spatial domain component vectors is $\lceil \log_2 N_s \rceil$. The quantity of bits occupied to indicate the quantity $M_1$ of the $M_1$ continuous spatial domain component vectors is $\lceil \log_2 X_1 \rceil$, and $X_1$ is a quantity of values of $M_1$. In summary, indication overheads of the third indication information are $\lceil \log_2 N_s \rceil + \lceil \log_2 X_1 \rceil$.

With reference to the first aspect, in some implementations of the first aspect, if $K_1+M_1 \leq N_s$, indexes of the plurality of spatial domain component vectors are $K_1$ to $K_1+M_1-1$; or if $K_1+M_1 > N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

The plurality of continuous spatial domain component vectors in this embodiment of this application have a "cyclic" feature. To be specific, in the candidate spatial domain component vector sequence including the $N_s$ candidate spatial domain component vectors, if a length of a large window exceeds a tail of the sequence, a remaining length of the window covers a head of the sequence. Using $N_s=10$ as an example (the indexes of the 10 candidate spatial domain component vectors are 0 to 9 sequentially), if the start position and the quantity of the plurality of continuous spatial domain component vectors are $K_1=3$ and $M_1=5$ respectively, indexes of five spatial domain component vectors corresponding to the length of the large window are 3 to 7 sequentially. If the start position and the quantity of the plurality of continuous spatial domain component vectors are $K_1=8$ and $M_1=5$ respectively, indexes of five spatial domain component vectors corresponding to the length of the large window are 8 to 9 and 0 to 2 sequentially. The foregoing cyclic feature can make the length of the large window as small as possible, so that fewer bits are used to indicate the start position and the window length of the large window, thereby reducing reporting overheads of the terminal device.

With reference to the first aspect, in some implementations of the first aspect, each piece of fourth indication information is used to indicate a plurality of groups of at least one continuous spatial domain component vector.

In this embodiment of this application, coverage of a group of at least one continuous spatial domain component vector is referred to as a "small window", and one piece of fourth indication information may indicate a plurality of small windows. The $L_i$ spatial domain component vectors corresponding to the $i^{th}$ spatial layer are all spatial domain component vectors included in a plurality of small windows indicated by fourth indication information corresponding to the $i^{th}$ spatial layer. Because the plurality of small windows are selected from the plurality of spatial domain component vectors indicated by the third indication information, the small windows are all included in a large window, and one large window may include a plurality of small windows. In this embodiment of this application, indication overheads for feeding back the positions of the spatial-frequency combination coefficients by the terminal device are reduced by using a combination of large window reporting and small window reporting.

With reference to the first aspect, in some implementations of the first aspect, each piece of fourth indication information includes fourth position indication information and a plurality of pieces of fourth sub indication information, the fourth position indication information is used to indicate a plurality of start positions of the plurality of groups of at least one continuous spatial domain component vector, and each piece of fourth sub indication information in the plurality of pieces of fourth sub indication information is used to indicate a quantity of at least one continuous spatial domain component vector in each of the plurality of groups of at least one continuous spatial domain component vector.

It should be understood that the fourth position indication information indicates, by using one piece of indication information, a plurality of start positions of a plurality of groups of at least one continuous spatial domain component vector corresponding to one piece of fourth indication information. "The plurality of groups of at least one continuous spatial domain component vector" means that there are a plurality of groups of at least one continuous spatial domain component vector. For example, two continuous spatial domain component vectors are a first group, and five continuous spatial domain component vectors are a second group. Assuming that there are five groups of at least one continuous spatial domain component vector, the fourth position indication information indicates five start positions corresponding to the five groups of at least one continuous spatial domain component vector.

With reference to the first aspect, in some implementations of the first aspect, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

In this case, quantities of spatial domain component vectors corresponding to all spatial layers are equal (all are L), L is a preconfigured or predefined integer, and the terminal device does not need to report. For each spatial layer, the terminal device may spare a window length of one small window during reporting, to reduce indication overheads of the fourth indication information.

According to a second aspect, another channel state information reporting method is provided. The method may be performed by a network device, or may be performed by a component (such as a circuit or a chip) disposed in the network device. This is not limited in this application.

The method includes: receiving first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and determining precoding vectors of each spatial layer in a plurality of frequency bands based on the first indication information and the plurality of groups of second indication information.

With reference to the second aspect, in some implementations of the second aspect, the plurality of frequency domain component vectors are continuous, the first indication information is used to indicate a start position $K_2$ of the plurality of frequency domain component vectors and a quantity $M_2$ of the plurality of frequency domain component vectors, $K_2$ is an integer greater than or equal to 0, and $M_2$ is an integer greater than or equal to 2.

With reference to the second aspect, in some implementations of the second aspect, in the first indication information, a quantity of bits occupied to indicate the start position of the plurality of frequency domain component vectors is $\lceil \log_2 M_2 \rceil$, and a frequency domain component vector corresponding to a strongest spatial-frequency component vector corresponding to each spatial layer is always a first frequency domain component vector in a candidate frequency domain component vector sequence.

With reference to the second aspect, in some implementations of the second aspect, if $K_2+M_2 \leq N_F$, indexes of the plurality of frequency domain component vectors are $K_2$ to $K_2+M_2-1$; or if $K_2+M_2>N_F$, indexes of the plurality of frequency domain component vectors are $K_2$ to $N_F-1$ and 0 to $(K_2+M_2-1) \bmod N_F$, where $N_F$ is a quantity of candidate frequency domain component vectors, $N_F$ is an integer greater than or equal to 2, and the plurality of frequency domain component vectors are selected from the $N_F$ candidate frequency domain component vectors.

With reference to the second aspect, in some implementations of the second aspect, each piece of second indication information is used to indicate a plurality of groups of at least one continuous frequency domain component vector.

With reference to the second aspect, in some implementations of the second aspect, each piece of second indication information includes second position indication information and a plurality of pieces of second sub indication information, the second position indication information is used to indicate a plurality of start positions of the plurality of groups of at least one continuous frequency domain component vector, and each piece of second sub indication information in the plurality of pieces of second sub indication information is used to indicate a quantity of at least one continuous frequency domain component vector in each of the plurality of groups of at least one continuous frequency domain component vector.

With reference to the second aspect, in some implementations of the second aspect, the method further includes: receiving third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and determining, based on the third indication information and the plurality of pieces of fourth indication information, at least one spatial domain component vector corresponding to each spatial layer.

With reference to the second aspect, in some implementations of the second aspect, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

With reference to the second aspect, in some implementations of the second aspect, if $K_1+M_1 \leq N_s$, indexes of the plurality of spatial domain component vectors are $K_1$ to $K_1+M_1-1$; or if $K_1+M_1>N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

With reference to the second aspect, in some implementations of the second aspect, each piece of fourth indication information is used to indicate a plurality of groups of at least one continuous spatial domain component vector.

With reference to the second aspect, in some implementations of the second aspect, each piece of fourth indication information includes fourth position indication information and a plurality of pieces of fourth sub indication information, the fourth position indication information is used to indicate a plurality of start positions of the plurality of groups of at least one continuous spatial domain component vector, and each piece of fourth sub indication information in the plurality of pieces of fourth sub indication information is used to indicate a quantity of at least one continuous spatial domain component vector in each of the plurality of groups of at least one continuous spatial domain component vector.

With reference to the second aspect, in some implementations of the second aspect, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

According to a third aspect, another channel state information reporting method is provided. The method may be performed by a terminal device, or may be performed by a component (such as a circuit or a chip) disposed in the terminal device. This is not limited in this application.

The method includes: generating third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer, and sending the third indication information and the plurality of pieces of fourth indication information.

With reference to the third aspect, in some implementations of the third aspect, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

With reference to the third aspect, in some implementations of the third aspect, if $K_1+M_1 \leq N_s$, indexes of the plurality of spatial domain component vectors are $K_1$ to $K_1+M_1-1$; or if $K_1+M_1>N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

With reference to the third aspect, in some implementations of the third aspect, each piece of fourth indication information is used to indicate a plurality of groups of at least one continuous spatial domain component vector.

With reference to the third aspect, in some implementations of the third aspect, each piece of fourth indication information includes fourth position indication information and a plurality of pieces of fourth sub indication information, the fourth position indication information is used to indicate a plurality of start positions of the plurality of groups of at least one continuous spatial domain component vector, and each piece of fourth sub indication information in the plurality of pieces of fourth sub indication information is used to indicate a quantity of at least one continuous spatial domain component vector in each of the plurality of groups of at least one continuous spatial domain component vector.

With reference to the third aspect, in some implementations of the third aspect, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

According to a fourth aspect, another channel state information reporting method is provided. The method may be performed by a network device, or may be performed by a component (such as a circuit or a chip) disposed in the network device. This is not limited in this application.

The method includes: receiving third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and determining, based on the third indication information and the plurality of pieces of fourth indication information, at least one spatial domain component vector corresponding to each spatial layer.

With reference to the fourth aspect, in some implementations of the fourth aspect, the plurality of spatial domain component vectors are continuous, the fourth indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

With reference to the fourth aspect, in some implementations of the fourth aspect, if $K_1+M_1 \leq N_s$, indexes of the plurality of spatial domain component vectors are $K_1$ to $K_1+M_1-1$, or if $K_1+M_1 > N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

With reference to the fourth aspect, in some implementations of the fourth aspect, each piece of fourth indication information is used to indicate a plurality of groups of at least one continuous spatial domain component vector.

With reference to the fourth aspect, in some implementations of the fourth aspect, each piece of fourth indication information includes fourth position indication information and a plurality of pieces of fourth sub indication information, the fourth position indication information is used to indicate a plurality of start positions of the plurality of groups of at least one continuous spatial domain component vector, and each piece of fourth sub indication information in the plurality of pieces of fourth sub indication information is used to indicate a quantity of at least one continuous spatial domain component vector in each of the plurality of groups of at least one continuous spatial domain component vector.

With reference to the fourth aspect, in some implementations of the fourth aspect, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

According to a fifth aspect, a communications apparatus is provided, and includes modules or units configured to perform the method in the first aspect or any possible implementation of the first aspect.

Specifically, the communications apparatus includes a processing unit and a transceiver unit. The processing unit is configured to generate first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and the transceiver unit is configured to send the first indication information and the second indication information.

According to a sixth aspect, a communications apparatus is provided, and includes modules or units configured to perform the method in the second aspect or any possible implementation of the second aspect.

Specifically, the communications apparatus includes a processing unit and a transceiver unit. The transceiver unit is configured to receive first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and the processing unit is configured to determine precoding vectors of each spatial layer in a plurality of frequency bands based on the first indication information and the plurality of groups of second indication information.

According to a seventh aspect, a communications apparatus is provided, including modules or units configured to perform the method in the third aspect or any possible implementation of the third aspect.

Specifically, the communications apparatus includes a processing unit and a transceiver unit. The processing unit is configured to generate third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and the transceiver unit is configured to send the third indication information and the plurality of pieces of fourth indication information.

According to an eighth aspect, a communications apparatus is provided, and includes modules or units configured to perform the method in the fourth aspect or any possible implementation of the fourth aspect.

Specifically, the communications apparatus includes a processing unit and a transceiver unit. The transceiver unit is configured to receive fourth indication information and a plurality of pieces of fourth indication information, where the fourth indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and the processing unit is configured to determine, based on the third indication information and the plurality of pieces of fourth indication information, at least one spatial domain component vector corresponding to each spatial layer.

According to a ninth aspect, a communications apparatus is provided, and includes a processor. The processor is coupled to a memory, and may be configured to execute instructions in the memory, to implement the method in the first aspect or any possible implementation of the first aspect, or the method in the third aspect or any possible implementation of the third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a tenth aspect, a communications apparatus is provided, and includes a processor. The processor is coupled to a memory, and may be configured to execute instructions in the memory, to implement the method in the second aspect or any possible implementation of the second aspect, or the method in the fourth aspect or any possible implementation of the fourth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to receive a signal through the input circuit, and transmit a signal through the output circuit, so that the processor performs the foregoing method in any aspect or any possible implementation of any aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a twelfth aspect, a processing apparatus is provided, and includes a processor and a memory. The processor is configured to read instructions stored in the memory, and can receive a signal through a receiver, and transmit a signal through a transmitter, to perform the foregoing method in any aspect or any possible implementation of any aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the twelfth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a thirteenth aspect, a communications system is provided, including a communications apparatus configured to implement the method in the first aspect or any possible implementation of the first aspect, and a communications apparatus configured to implement the method in the second aspect or any possible implementation of the second aspect; or a communications apparatus configured to implement the method in the third aspect or any possible implementation of the third aspect, and a communications apparatus configured to implement the method in the fourth aspect or any possible implementation of the fourth aspect.

In a possible design, the communications system may include the foregoing terminal device and the foregoing network device.

In a possible design, the communications system may further include other devices that interact with the terminal device and/or the network device in the solutions provided in the embodiments of this application.

According to a fourteenth aspect, a computer program product is provided. The computer program product includes a computer program (which may also be referred to as code or instructions). When the computer program is run, a computer is enabled to perform the method in any aspect or any possible implementation of the aspect.

According to a fifteenth aspect, a computer-readable medium is provided. The computer-readable medium stores a computer program (which may also be referred to as code or instructions). When the computer program is run on a computer, the computer is enabled to perform the method in any aspect or any possible implementation of the aspect.

According to a sixteenth aspect, a chip system is provided, and includes a memory and a processor. The memory is configured to store a computer program. The processor is configured to: invoke the computer program from the memory, and run the computer program, so that a communications device in which the chip system is installed performs the method in any possible implementation of any aspect.

The chip system may include an input circuit or interface configured to send information or data, and an output circuit or interface configured to receive information or data.

DESCRIPTION OF EMBODIMENTS

Figure 1:
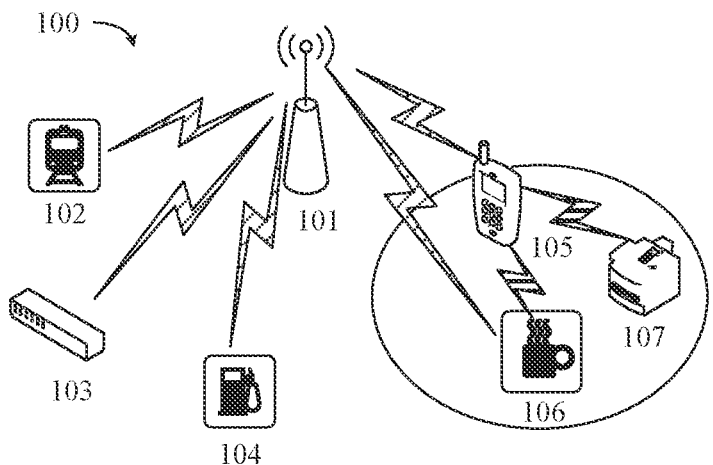
FIG. 1 is a schematic diagram of a communications system to which an embodiment of this application is applicable.

The following describes technical solutions of this application with reference to the accompanying drawings.

The technical solutions in embodiments of this application may be applied to various communications systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system or a new radio (NR) system, a vehicle-to-everything (V2X) system, a long term evolution-vehicle (LTE-V) system, an internet of vehicles system, a machine type communication (MTC) system, an internet of things (IoT) system, a long term evolution-machine (LTE-M) system, and a machine to machine (M2M) system, where V2X may include vehicle to network (V2N), vehicle to vehicle (V2V), vehicle to infrastructure (V2I), vehicle to pedestrian (V2P), and the like.

In embodiments of this application, the network device may be any device having a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB or a home NodeB HNB), a base band unit (BBU), an access point (AP) in a wireless fidelity (WIFI) system, a wireless relay node, a wireless backhaul node, a transmission point (TP), a transmission and reception point (TRP), or the like, or may be a gNB or a transmission point (TRP or TP) in a 5G (such as NR) system, or one antenna panel or a group of antenna panels (including a plurality of antenna panels) of a base station in a 5G system, or may be a network node that constitutes a gNB or a transmission point, for example, a base band unit (BBU), or a distributed unit (DU).

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (RAN), or may be classified as a network device in a core network (CN). This is not limited in this application.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

In embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a cellular phone, a cordless telephone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. IoT is an important part in development of future information technologies. A main technical feature of IoT is to connect an object to a network by using a communications technology, to implement an intelligent network for human-machine interconnection and thing-thing interconnection.

A specific form of the terminal device is not limited in this application.

For ease of understanding of the embodiments of this application, first, a communications system to which the embodiments of this application are applicable is described in detail with reference to FIG. 1. FIG. 1 is a schematic diagram of a communications system to which a channel state information reporting method and a communications apparatus in the embodiments of this application are applicable. As shown in FIG. 1, the communications system 100 may include at least one network device, for example, a network device 101 shown in FIG. 1. The communications system 100 may further include at least one terminal device, for example, terminal devices 102 to 107 shown in FIG. 1. The terminal devices 102 to 107 may be mobile or fixed. The network device 101 may communicate with one or more of the terminal devices 102 to 107 by using a radio link. Each network device may provide communication coverage for a particular geographical area, and may communicate with a terminal device located in the coverage area.

Optionally, the terminal devices 102 to 107 may directly communicate with each other. For example, direct communication between the terminal devices may be implemented by using a device to device (D2D) technology. As shown in the figure, direct communication may be performed between the terminal devices 105 and 106 or between the terminal devices 105 and 107 by using the D2D technology. The terminal device 106 and the terminal device 107 may separately or simultaneously communicate with the terminal device 105.

The terminal devices 105 to 107 may separately communicate with the network device 101. For example, the terminal devices may directly communicate with the network device 101. For example, the terminal devices 105 and 106 in the figure may directly communicate with the network device 101. Alternatively, the terminal devices may indirectly communicate with the network device 101. For example, the terminal device 107 in the figure communicates with the network device 101 by using the terminal device 106.

It should be understood that FIG. 1 is an example showing one network device, a plurality of terminal devices, and a communications link between communication devices. Optionally, the communications system 100 may include a plurality of network devices, and coverage of each network device may include another quantity of terminal devices, for example, more or fewer terminal devices. This is not limited in this application.

A plurality of antennas may be configured for the communication devices, such as the network device 101 and the terminal devices 102 to 107 in FIG. 1. The plurality of antennas may include at least one transmit antenna configured to send a signal and at least one receive antenna configured to receive a signal. In addition, each communications device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communications system 100 may further include another network entity such as a network controller or a mobility management entity. This is not limited in the embodiments of this application.

For ease of understanding of the embodiments of this application, the following briefly describes terms used in the embodiments of this application.

1. Precoding Technology

When a channel state is known, a sending device (for example, a network device) may process a to-be-sent signal by using a precoding matrix that matches the channel state, so that the precoded to-be-sent signal is adapted to a channel, and complexity of canceling inter-channel interference by a receiving device (for example, a terminal device) is reduced. Therefore, after the to-be-sent signal is precoded, quality (for example, a signal to interference plus noise ratio (SINR)) of a received signal is improved. Therefore, transmission between a transmit device and a plurality of receiving devices can be implemented on a same time-frequency resource by using the precoding technology. That is, multi-user multiple-input multiple-output (MU-MIMO) is implemented.

It should be understood that the related description of the precoding technology is merely an example for ease of understanding, and is not intended to limit the protection scope of the embodiments of this application. In a specific implementation process, the sending device may further perform precoding in another manner. For example, when channel information (for example, but not limited to, a channel matrix) cannot be obtained, precoding is performed by using a preset precoding matrix or in a weighting processing manner. For brevity, specific content thereof is not described in the specification.

2. Channel State Information Report (CSI Report)

The CSI report may also be referred to as CSI for short. In a wireless communications system, it is information reported by a receive end (for example, a terminal device) to a transmit end (for example, a network device) and used to describe a channel attribute of a communications link. The CSI report may include, for example, but is not limited to, a precoding matrix indicator (PMI), a rank indication (RI), a channel quality indicator (CQI), a channel state information reference signal (CSI-RS) resource indicator (CRI), and a layer indicator (LI). It should be understood that the foregoing listed specific content of the CSI is merely an example for description, and shall not constitute any limitation on this application. The CSI may include one or more of the foregoing listed content, or may include other information that is different from the foregoing listed content and that is used to represent the CSI. This is not limited in this application.

3. Precoding Matrix Indicator (PMI)

The PMI may be used to indicate a precoding matrix. The precoding matrix may be a precoding matrix determined by the terminal device, for example, based on each frequency domain unit (for example, a frequency domain length of one frequency domain unit may be a subband, or a subband multiplied by a, where a≤1, and a value of a may be 1 or ½, or a frequency domain length of one frequency domain unit is a resource block (RB), or a resource element (RE), or a multiple of an RE). The channel matrix may be determined by the terminal device through channel estimation or in another manner or based on channel reciprocity. However, it should be understood that a specific method for determining the precoding matrix by the terminal device is not limited to the foregoing description. For a specific implementation, refer to the current technology. For brevity, details are not listed herein.

For example, the precoding matrix may be obtained by performing singular value decomposition (SVD) on the channel matrix or a covariance matrix of the channel matrix, or may be obtained by performing eigenvalue decomposition (EVD) on a covariance matrix of the channel matrix. It should be understood that the foregoing listed manners of determining the precoding matrix are merely examples, and should not constitute any limitation on this application. For a manner of determining the precoding matrix, refer to the existing technology. For brevity, details are not listed herein.

The precoding matrix determined by the terminal device may be referred to as a to-be-fed-back precoding matrix, or a to-be-reported precoding matrix. The terminal device may indicate the to-be-fed-back precoding matrix through the PMI, so that the network device restores the precoding matrix based on the PMI. The precoding matrix restored by the network device based on the PMI may be the same as or similar to the to-be-fed-back precoding matrix.

In downlink channel measurement, if the precoding matrix determined by the network device based on the PMI is more approximate to the precoding matrix determined by the terminal device, the precoding matrix determined by the network device for data transmission can be better adapted to the downlink channel, and therefore, signal transmission quality can be improved.

It should be understood that the PMI is merely a name, and should not constitute any limitation on this application. This application does not preclude a possibility of defining signaling with other names for the same or similar functions in a future protocol.

It should be noted that, according to the method provided in the embodiments of this application, the network device may determine, based on feedback of the terminal device, a precoding matrix corresponding to one or more frequency domain units. The precoding matrix determined by the network device may be directly used for downlink data transmission. Some beamforming methods, including, for example, zero-forcing (ZF), regularized zero-forcing (RZF), minimum mean-squared error (MMSE), and maximum signal-to-leakage-and-noise (SLNR), may also be used to obtain a precoding matrix finally used for downlink data transmission. This is not limited in this application. Unless otherwise specified, all precoding matrices mentioned below may be determined according to the method provided in this application.

4. Spatial Layer

In MIMO, a spatial layer may be considered as a data stream that can be independently transmitted. To improve spectrum resource utilization and improve a data transmission capability of a communications system, the network device may transmit data to the terminal device through a plurality of spatial layers.

A quantity of spatial layers is a rank of a channel matrix. The terminal device may determine the quantity R of spatial layers based on the channel matrix obtained through channel estimation, to further determine the precoding matrix. For example, the precoding matrix may be determined by performing SVD on the channel matrix or a covariance matrix of the channel matrix. In the SVD process, different spatial layers may be distinguished based on eigenvalues. For example, a precoding vector determined by an eigenvector corresponding to a largest eigenvalue may correspond to a first spatial layer, and a precoding vector determined by an eigenvector corresponding to a smallest eigenvalue may correspond to an $R^{th}$ spatial layer. In other words, eigenvalues corresponding to the first spatial layer to the $R^{th}$ spatial layer decrease sequentially. Simply, intensity of R spatial layers from the first spatial layer to the $R^{th}$ spatial layer decreases sequentially.

It should be understood that distinguishing the different spatial layers based on the eigenvalues is merely a possible implementation, and should not constitute any limitation on this application. For example, another criterion for distinguishing spatial layers may also be predefined in a protocol. This is not limited in this application.

5. Precoding Vector

A precoding matrix may include one or more vectors, such as a column vector. One precoding matrix may be used to determine one or more precoding vectors.

When the quantity of spatial layers is 1 and a quantity of polarization directions of a transmit antenna is also 1, the precoding matrix is the precoding vector. When the quantity of spatial layers is multiple and the quantity of polarization directions of the transmit antenna is 1, the precoding vector may be a component of the precoding matrix in one spatial layer. When a quantity of spatial layers is 1 and a quantity of polarization directions of transmit antennas is multiple, the precoding vector may be a component of a precoding matrix in one polarization direction. When the quantity of spatial layers is multiple and the quantity of polarization directions of the transmit antenna is also multiple, the precoding vector may be a component of the precoding matrix in one spatial layer and one polarization direction.

It should be understood that the precoding vector may alternatively be determined by a vector in a precoding matrix, for example, obtained after mathematical transformation is performed on the vector in the precoding matrix. A mathematical transformation relationship between the precoding matrix and the precoding vector is not limited in this application.

6. Antenna Port

The antenna port may be referred to as a port. The antenna port may be understood as a transmit antenna identified by a receive device, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a reference signal port, for example, a CSI-RS port or a sounding reference signal (SRS) port. In the embodiments of this application, the reference signal may be a non-precoded reference signal, or may be a precoded reference signal. This is not limited in this application. When the reference signal is a precoded reference signal, the reference signal port may be a transmit antenna port. The transmit antenna port may be an independent transceiver unit (TxRU).

7. Spatial Domain Vector

The spatial domain vector may also be referred to as a spatial domain component vector, a beam vector, a spatial domain beam basis vector, a spatial domain basis vector, or the like. Each element in the spatial domain vector may represent a weight of each antenna port. Based on the weight of each antenna port that is represented by each element in the spatial domain vector, signals of the antenna ports are linearly superposed, to form an area with a strong signal in a direction in space.

For ease of description below, it is assumed that the spatial domain vector is denoted as u. A length of the spatial domain vector u may be a quantity $N_s$ of transmit antenna ports in one polarization direction, where $N_s$ is an integer greater than or equal to 1. The spatial domain vector may be, for example, a column vector or a row vector whose length is $N_s$. This is not limited in this application.

Optionally, the spatial domain vector is a discrete Fourier transform (DFT) vector. The DFT vector may be a vector in a DFT matrix.

Optionally, the spatial domain vector is a conjugate transpose vector of the DFT vector. The DFT conjugate transpose vector may be a column vector in a conjugate transpose matrix of the DFT matrix.

Optionally, the spatial domain vector is an oversampled DFT vector. The oversampled DFT vector may be a vector in an oversampled DFT matrix.

In a possible design, the spatial domain vector may be, for example, a two-dimensional (2D)-DFT vector $v_{l,m}$ defined in a type II codebook in an NR protocol TS 38.214 release 15 (R15). In other words, the spatial domain vector may be a 2D-DFT vector or an oversampled 2D-DFT vector. For brevity, a detailed description of the 2D-DFT vector is omitted herein.

In the embodiments of this application, the spatial domain vector is one of the vectors used to construct the precoding matrix.

8. Candidate Spatial Domain Vector Set

The candidate spatial domain vector set may also be referred to as a candidate spatial domain component vector set, a spatial domain component vector set, a candidate spatial domain basis vector set, a spatial domain basis vector set, a candidate beam vector set, a beam vector set, a candidate spatial domain beam basis vector set, a spatial domain beam basis vector set, or the like. A plurality of (candidate) spatial domain vectors of different lengths may be included to correspond to different antenna port quantities. In the embodiments of this application, spatial domain vectors used to construct the precoding vector may be determined from the candidate spatial domain vector set. In other words, the candidate spatial domain vector set includes a plurality of candidate spatial domain vectors that can be used to construct the precoding vector.

In a possible design, the candidate spatial domain vector set may include $N_s$ candidate spatial domain vectors, and the $N_s$ candidate spatial domain vectors may be pairwise orthogonal. Each candidate spatial domain vector in the candidate spatial domain vector set may be a vector in a 2D-DFT matrix. 2D may represent two different directions, for example, a horizontal direction and a vertical direction. If a quantity of antenna ports in the horizontal direction and a quantity of antenna ports in the vertical direction are $N_1$ and $N_2$ respectively, $N_s = N_1 \times N_2$. $N_s$, $N_1$, and $N_2$ are all positive integers.

The $N_s$ candidate spatial domain vectors may be denoted, for example, as $u_0, u_1, \ldots, u_{N_s-1}$. The $N_s$ candidate spatial domain vectors may construct a matrix $B_s$, where $B_s \triangleq [u_0, u_1 \ldots u_{N_s-1}]$. The matrix $B_s$ may be used to perform spatial domain compression described later to select one or more candidate spatial domain vectors for constructing the precoding matrix. If each candidate spatial domain vector in the candidate spatial domain vector set is selected from the 2D-DFT matrix, $B_s = D_{N_1} \otimes D_{N_2}$, where $D_N$ is an N×N orthogonal DFT matrix, and an element in an $m^{th}$ row and an $n^{th}$ column is $$[D_N]_{m,n} = \frac{1}{\sqrt{N}} e^{\frac{j2\pi mn}{N}}.$$

In another possible design, the candidate spatial domain vector set may be extended to $O_s \times N_s$ candidate spatial domain vectors by using an oversampling factor $O_s$. In this case, the candidate spatial domain vector set may include $O_s$ subsets, and each subset may include $N_s$ candidate spatial domain vectors. The $N_s$ candidate spatial domain vectors in each subset may be pairwise orthogonal. Each candidate spatial domain vector in the candidate spatial domain vector set may be selected from an oversampled 2D-DFT matrix.

The oversampling factor $O_s$ is a positive integer. Specifically, $O_s=O_1 \times O_2$, where $O_1$ may be an oversampling factor in a horizontal direction, and $O_2$ may be an oversampling factor in a vertical direction. $O_1 \geq 1$, $O_2 \geq 1$, $O_1$ and $O_2$ are both integers but cannot be both 1.

$N_s$ candidate spatial domain vectors in an $o_s^{th}$ ($0 \leq o_s \leq O_s-1$ and $o_s$ is an integer) subset in the candidate spatial domain vector set may be respectively denoted, for example, as $u_1^{o_s}$, $u_2^{o_s}, \ldots, u_{N_s}^{o_s}$. In this case, a matrix $B_s^{o_s}$ may be constructed based on the $N_s$ candidate spatial domain vectors in the $o_s^{th}$ subset, and $B_s^{o_s} \triangleq [u_1^{o_s} u_2^{o_s} \ldots u_{N_s}^{o_s}]$. A matrix including one or more subsets of the $O_s$ subsets may be used to perform spatial domain compression described later to select one or more spatial domain vectors for constructing the precoding matrix.

It should be understood that a specific form of the candidate spatial domain vector set and a specific form of the candidate spatial domain vector are not limited in this application.

9. Frequency Domain Unit

The frequency domain unit is a frequency domain resource unit, and may represent different frequency domain resource granularities. The frequency domain unit, for example, may include but is not limited to a subband, a resource block (RB), a subcarrier, a resource block group (RBG), or a precoding resource block group (PRG). In addition, a frequency domain length of one frequency domain unit may alternatively be a CQI subband multiplied by R, where R is less than or equal to 1, and a value of R may be, for example, 1 or ½. In a possible implementation, the value of R may be preconfigured by the network device for the terminal device by using signaling. In addition, a frequency domain length of one frequency domain unit may alternatively be an RB.

In the embodiments of this application, a precoding matrix corresponding to the frequency domain unit may be a precoding matrix determined by performing channel measurement and feedback based on a reference signal on the frequency domain unit. The precoding matrix corresponding to the frequency domain unit may be used to precode data subsequently transmitted on the frequency domain unit. In the following description, the precoding matrix corresponding to the frequency domain unit may also be referred to as the precoding matrix of the frequency domain unit for short.

10. Frequency Domain Vector

The frequency domain vector may also be referred to as a frequency domain component vector, a frequency domain basis vector, or the like. The frequency domain vector is a vector that may be used to represent a change rule of a channel in frequency domain. Each frequency domain vector may represent a change rule. When a signal is transmitted over a radio channel, the signal may arrive at a receive antenna from a transmit antenna through a plurality of paths. Frequency selective fading caused by multipath delay is a change in a frequency domain channel. Therefore, different frequency domain vectors may be used to represent a change rule of the channel in frequency domain caused by delays on different transmission paths.

A length of a frequency domain vector $u_f$ may be denoted as $N_f$, where $N_f$ is a positive integer, and the frequency domain vector may be, for example, a column vector or a row vector whose length is $N_f$. The length of the frequency domain vector may be determined by a quantity of to-be-reported frequency domain units preconfigured in a reporting bandwidth, or may be determined by a reporting bandwidth, or may be a value predefined in a protocol. The length of the frequency domain vector is not limited in this application. For example, the reporting bandwidth may be a CSI reporting bandwidth (csi-ReportingBand) carried in a CSI reporting preconfiguration in higher layer signaling (such as a radio resource control (RRC) message).

All frequency domain vectors corresponding to all spatial domain vectors corresponding to each spatial layer may be referred to as frequency domain vectors corresponding to the spatial layer. Frequency domain vectors corresponding to different spatial layers may be the same or may be different.

11. Candidate Frequency Domain Vector Set

The candidate frequency domain vector set may also be referred to as a candidate frequency domain component vector set, a frequency domain component vector set, a frequency domain basis vector set, a frequency domain vector set, or the like, and may include a plurality of candidate frequency domain vectors of different lengths. In the embodiments of this application, the frequency domain vectors used to construct the precoding vector may be determined from the candidate frequency domain vector set. In other words, the candidate frequency domain vector set includes a plurality of candidate frequency domain vectors that can be used to construct the precoding vector.

In a possible design, the candidate frequency domain vector set may include $N_f$ candidate frequency domain vectors. The $N_f$ candidate frequency domain vectors may be pairwise orthogonal. Each candidate frequency domain vector in the candidate frequency domain vector set may be a vector in the DFT matrix or an IDFT matrix (that is, the conjugate transpose matrix of the DFT matrix).

For example, the $N_f$ candidate frequency domain vectors may be denoted, for example, as $v_0, v_1, \ldots, v_{N_f-1}$. The $N_f$ candidate frequency domain vectors may construct a matrix $B_f$, where $B_f \triangleq [v_0 \ v_1 \ldots v_{N_f-1}]$. The matrix may be used to perform frequency domain compression described later to select one or more frequency domain vectors for constructing the precoding matrix.

In another possible design, the candidate frequency domain vector set may be extended to $O_f \times N_f$ candidate frequency domain basis vectors by using an oversampling factor $O_f$. In this case, the candidate frequency domain vector set may include $O_f$ subsets, and each subset may include $N_f$ candidate frequency domain basis vectors. The $N_f$ candidate frequency domain basis vectors in each subset may be pairwise orthogonal. Each candidate frequency domain vector in the candidate frequency domain vector set may be selected from an oversampled DFT matrix or a conjugate transpose matrix of an oversampled DFT matrix. The oversampling factor $O_f$ is a positive integer.

Therefore, each candidate frequency domain vector in the candidate frequency domain vector set may be selected from the DFT matrix or the oversampled DFT matrix, or from the conjugate transpose matrix of the DFT matrix or the conjugate transpose matrix of the oversampled DFT matrix. Each column vector in the candidate frequency domain vector set may be referred to as a DFT vector or an oversampled DFT vector. In other words, the candidate frequency domain vector may be a DFT vector or an oversampled DFT vector.

12. Spatial-Frequency Vector Pair

The spatial-frequency vector pair may also be referred to as a spatial-frequency component vector. One spatial domain vector and one frequency domain vector may be combined to obtain one spatial-frequency vector pair. In other words, one spatial-frequency vector pair may include one spatial domain vector and one frequency domain vector.

One spatial-frequency component matrix may be obtained by using a spatial domain vector and a frequency domain vector in one spatial-frequency vector pair. For example, one spatial-frequency component matrix may be obtained by multiplying one spatial-frequency vector by a conjugate transpose of one frequency domain vector. The spatial-frequency component matrix described herein is relative to a spatial-frequency matrix described later. The spatial-frequency matrix can be obtained by performing weighted summation on a plurality of spatial-frequency component matrices. Therefore, each term used for weighting may be referred to as a component of the spatial-frequency matrix, that is, the spatial-frequency component matrix herein.

13. Spatial-Frequency Matrix

In the embodiments of this application, the spatial-frequency matrix may be understood as an intermediate quantity used to determine a precoding matrix or a channel matrix corresponding to each frequency domain unit. For the terminal device, the spatial-frequency matrix may be determined based on the precoding matrix or a channel matrix corresponding to each frequency domain unit. For the network device, the spatial-frequency matrix may be obtained by using a weighted sum of a plurality of spatial-frequency component matrices, to restore the channel matrix or the precoding matrix.

For example, the spatial-frequency matrix may be denoted as H, where $H=[w_0 \ w_1 \cdots w_{N_f-1}]$, $w_0$ to $w_{N_f-1}$ are $N_f$ column vectors corresponding to $N_f$ frequency domain units, each column vector may be a precoding matrix corresponding to each frequency domain unit, and a length of each column vector may be $N_s$. The $N_f$ column vectors correspond to precoding vectors of the $N_f$ frequency domain units. That is, the spatial-frequency matrix may be considered as a joint matrix formed by combining the precoding vectors corresponding to the $N_f$ frequency domain units.

In a possible design, the spatial-frequency matrix may correspond to a spatial layer. The spatial-frequency matrix corresponds to the spatial layer because the terminal device may feedback a frequency domain vector and a spatial-frequency combination coefficient based on each spatial layer. A spatial-frequency matrix determined by the network device based on the feedback of the terminal device is the spatial-frequency matrix corresponding to the spatial layer. The spatial-frequency matrix corresponding to the spatial layer may be directly used to determine the precoding matrix corresponding to each frequency domain unit. For example, a precoding matrix corresponding to a frequency domain unit may be constructed by using column vectors that correspond to a same frequency domain unit and that are in spatial-frequency matrices corresponding to spatial layers. For example, an $n^{th}$ ($0 \leq n \leq N_3-1$, and n is an integer) column vector in a spatial-frequency matrix corresponding to each spatial layer is extracted, and a matrix whose dimensions are $N_s \times Z$ may be obtained based on an order of spatial layers from left to right. Z represents a quantity of spatial layers, and Z is an integer greater than or equal to 1. Normalization processing is performed on the matrix. For example, the matrix is multiplied by a power normalization coefficient, to obtain a precoding matrix of the $n^{th}$ frequency domain unit.

It should be understood that normalization processing is performed on the matrix by multiplying by the power normalization coefficient is only a possible implementation, and should not constitute any limitation on this application. A specific manner of normalization processing is not limited in this application.

It should be understood that the spatial-frequency matrix is merely a representation form used to determine an intermediate quantity of a precoding matrix or a channel matrix, and should not constitute any limitation on this application. For example, column vectors in the spatial-frequency matrix are sequentially connected end to end in an order from left to right, or arranged based on another predefined rule, so that a vector whose length is $N_s \times N_f$ can also be obtained, and the vector may be referred to as a spatial-frequency vector.

It should be further understood that the dimensions of the spatial-frequency matrix and the spatial-frequency vector shown above are merely examples, and should not constitute any limitation on this application. For example, the spatial-frequency matrix may also be a matrix whose dimensions are $N_f \times N_s$. Each row vector may correspond to one frequency domain unit, to determine a precoding vector of the corresponding frequency domain unit.

In addition, when a transmit antenna is configured with a plurality of polarization directions, the dimension of the spatial-frequency matrix may further be extended. For example, for a dual-polarized directional antenna, dimensions of the spatial-frequency matrix may be $2N_s \times N_f$ or $N_f \times 2N_s$. It should be understood that a quantity of polarization directions of a transmit antenna is not limited in this application.

14. Spatial-Frequency Combination Coefficient

The spatial-frequency combination coefficient may also be referred to as a spatial-frequency coefficient, a weighting coefficient, or the like. Each spatial-frequency combination coefficient may correspond to one spatial domain vector and one frequency domain vector, or each spatial-frequency combination coefficient may correspond to one spatial-frequency vector pair. Each spatial-frequency combination coefficient is a weighting coefficient or a weight of a spatial-frequency component matrix constructed by a spatial-frequency vector pair corresponding to the spatial-frequency combination coefficient. The spatial-frequency combination coefficient corresponds to one spatial domain vector and one frequency domain vector. Specifically, an element in an $i^{th}$ row and a $j^{th}$ column in a spatial-frequency combination coefficient matrix $\tilde{W}$ is a combination coefficient corresponding to a spatial-frequency vector pair formed by an $i^{th}$ spatial domain vector and a $j^{th}$ frequency domain vector. For the dual-polarized directional antenna, $i \in \{1, 2, \cdots, 2L\}$, and a length of each spatial domain vector is $2N_s$.

In an implementation, to control reporting overheads, the terminal device may report only a subset of 2LM combination coefficients included in the spatial-frequency combination coefficient matrix $\tilde{W}$. Specifically, the network device may configure a maximum quantity $K_0$ of spatial-frequency combination coefficients that correspond to each spatial layer and can be reported by the terminal device, where $K_0 \leq 2LM$. There may be a proportion relationship between $K_0$ and a total quantity 2LM of combination coefficients included in $\tilde{W}$, for example, $K_0 = \beta \cdot 2LM$, where a value of $\beta$ may be $\{3/4, 1/2, 1/4\}$. In addition, the terminal device may report only $K_1$ spatial-frequency combination coefficients whose amplitudes are not zero, and $K_1 \leq K_0$.

Each spatial-frequency combination coefficient may include an amplitude and a phase. For example, in a spatial-frequency combination coefficient $ae^{j\theta}$, a is an amplitude and $\theta$ is a phase.

In an implementation, amplitude values and phase values of the reported $K_1$ spatial-frequency combination coefficients may be quantized independently. An amplitude quantization method includes the following operations.

(1) For the $K_1$ combination coefficients, a combination coefficient with a largest amplitude value is used as a reference, and the $K_1$ combination coefficients are normalized. If an $i^{th}$ combination coefficient is $c_i$ before normalization, the $i^{th}$ combination coefficient is $c_i'=c_i/c_j$, after normalization, where $c_j$ is the combination coefficient with the largest amplitude value. After normalization, a combination coefficient with a largest quantization reference amplitude value is 1.

(2) The terminal device reports an index of the combination coefficient with the largest amplitude value, where indication information indicating the index of the combination coefficient with the largest amplitude value may include $\lceil \log_2 K_1 \rceil$ bits.

(3) For a polarization direction in which the combination coefficient with the largest amplitude value is located, the quantization reference amplitude value is 1. For another polarization direction, an amplitude of a combination coefficient with a largest amplitude in the polarization direction may be used as a quantization reference amplitude value in the polarization direction. The quantization reference amplitude value is quantized by using four bits and reported, and a candidate quantization reference amplitude value includes:

$$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{12}}\right)^{\frac{1}{4}}, 0\right\}.$$

(4) For each polarization direction, 3-bit quantization is performed on a differential amplitude value of each combination coefficient by referring to a quantization reference amplitude value corresponding to the polarization direction, where a candidate differential amplitude value includes:

$$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

The differential amplitude value represents a difference relative to the quantization reference amplitude value corresponding to the polarization direction. If a quantization reference amplitude value corresponding to a polarization direction in which a combination coefficient is located is A, and a quantized differential amplitude value of the combination coefficient is B, a quantized amplitude value of the combination coefficient is A×B.

(5) A phase of each normalized combination coefficient is quantized by using three bits (8PSK) or four bits (16PSK).

In a plurality of spatial-frequency vector pairs selected by the terminal device for constructing the precoding matrix, each spatial-frequency vector pair may correspond to one spatial-frequency combination coefficient. In a plurality of spatial-frequency combination coefficients corresponding to the plurality of spatial-frequency vector pairs, amplitude values of some spatial-frequency combination coefficients may be zero or close to zero, and quantized values corresponding to the spatial-frequency combination coefficients may be zero. A spatial-frequency combination coefficient whose amplitude is quantized by using a quantized value zero may be referred to as a spatial-frequency combination coefficient with a zero amplitude. Correspondingly, amplitude values of some spatial-frequency combination coefficients are relatively large, and quantized values corresponding to the spatial-frequency combination coefficients are not zero. A spatial-frequency combination coefficient whose amplitude is quantized by using a non-zero quantized value may be referred to as a spatial-frequency combination coefficient with a non-zero amplitude. In other words, the plurality of spatial-frequency combination coefficients corresponding to the plurality of spatial-frequency vector pairs may be formed by one or more spatial-frequency combination coefficients with non-zero amplitudes and one or more spatial-frequency combination coefficients with zero amplitudes.

It should be understood that the spatial-frequency combination coefficient may be indicated by using a quantized value, or may be indicated by using an index of a quantized value, or may be indicated by using a non-quantized value. A manner of indicating the spatial-frequency combination coefficient is not limited in this application, provided that the receive end can learn the spatial-frequency combination coefficient. Hereinafter, for ease of description, information used to indicate the spatial-frequency combination coefficient is referred to as quantization information of the spatial-frequency combination coefficient. The quantization information may be, for example, a quantized value, an index, or any other information that can be used to indicate the spatial-frequency combination coefficient.

15. Dual-Domain Compression

The dual-domain compression may include compression in two dimensions: spatial domain compression and frequency domain compression. Spatial domain compression may specifically mean that one or more spatial domain vectors are selected from a spatial domain vector set to construct a precoding vector. Frequency domain compression may mean that one or more frequency domain vectors are selected from a frequency domain vector set to construct a precoding vector. As described above, for example, a matrix constructed by using one spatial domain vector and one frequency domain vector may be referred to as a spatial-frequency component matrix. The one or more selected spatial domain vectors and the one or more selected frequency domain vectors may be used to construct one or more spatial-frequency component matrices. A weighted sum of the one or more spatial-frequency component matrices may be used to construct a spatial-frequency matrix corresponding to one spatial layer. In other words, the spatial-frequency matrix may approximate to the weighted sum of the spatial-frequency component matrices that are constructed by using the one or more selected spatial domain vectors and the one or more selected frequency domain vectors. Based on the spatial-frequency matrix corresponding to the spatial layer, a precoding vector corresponding to each frequency domain unit in the spatial layer may be further determined.

Specifically, the one or more selected spatial domain vectors may form a matrix $W_1$, where each column vector in $W_1$ corresponds to one selected spatial domain vector. The one or more selected frequency domain vectors may be used to construct a matrix $W_3$, where each column vector in $W_3$ corresponds to one selected frequency domain vector. A spatial-frequency matrix H may be expressed as a result of linear combination of the one or more selected spatial domain vectors and the one or more selected frequency domain vectors:

$$H = W_1 \tilde{W} W_3^H.$$

A spatial-frequency matrix corresponding to a spatial layer is used as an example. A spatial-frequency matrix corresponding to one spatial layer is $H = W_1 \tilde{W} W_3^H$.

When the rank R is greater than 1, spatial domain vectors used by all spatial layers may not be completely the same, that is, each spatial layer uses an independent spatial domain vector. Spatial domain vectors used by all spatial layers may also be the same, that is, a plurality of spatial layers share L spatial domain vectors.

When the rank R is greater than 1, frequency domain vectors used by all spatial layers may not be completely the same, that is, each spatial layer uses an independent frequency domain vector. Frequency domain vectors used by all spatial layers may also be the same, that is, a plurality of spatial layers share M frequency domain vectors. It is assumed that each spatial layer uses an independent frequency domain vector. For example, an $i^{th}$ ($0 \leq i \leq R-1$, where i is an integer) spatial layer in the R spatial layers corresponds to $M^i$ frequency domain vectors, that is, there are $M^i$ frequency domain vectors reported by the terminal device and corresponding to the $i^{th}$ spatial layer, where $M^i \geq 1$, and $M^i$ is an integer.

In this case, a precoding vector corresponding to each frequency domain unit in the $i^{th}$ spatial layer may be constructed based on the L spatial domain vectors and $M^i$ frequency domain vectors.

If a dual-polarized directional transmit antenna is used, L spatial domain vectors may be selected for each polarization direction. In this case, dimensions of $W_1$ may be $2N_s \times 2L$. In a possible implementation, the two polarization directions may use same L spatial domain vectors $\{b_s^0, b_s^1, \ldots, b_s^{L-1}\}$, where $b_s^0, b_s^1, \ldots, b_s^{L-1}$, for example, may be L spatial domain vectors selected from the foregoing spatial domain vector set. In this case, $W_1$ may be represented as:

$$\begin{bmatrix} b_s^0 & b_s^1 & \ldots & b_s^{L-1} & 0 & 0 & \ldots & 0 \\ 0 & 0 & \ldots & 0 & b_s^0 & b_s^1 & \ldots & b_s^{L-1} \end{bmatrix},$$

where $b_s^i$ represents an $i^{th}$ spatial domain vector in the L selected spatial domain vectors, and $i=0, 1, \ldots, L-1$.

For the $i^{th}$ spatial layer, dimensions of $W_3^H$ may be $M^i \times N_f$. Each column vector in $W_3$ may be one frequency domain vector. In this case, each spatial domain vector in $W_1$ and each frequency domain vector in $W_3$ may form one spatial-frequency vector pair, and each spatial-frequency vector pair may correspond to one spatial-frequency combination coefficient. $2L \times M^i$ spatial-frequency vector pairs constructed by using 2L spatial domain vectors and $M^i$ frequency domain vectors may correspond to $2L \times M^i$ spatial-frequency combination coefficients on a one-to-one basis.

For the $i^{th}$ spatial layer, $\tilde{W}$ may be a coefficient matrix formed by the foregoing $2L \times M^i$ spatial-frequency combination coefficients, and dimensions of the matrix may be $2L \times M^i$. An $l^{th}$ row in the coefficient matrix $\tilde{W}$ may correspond to an $l^{th}$ spatial domain vector in a first polarization direction among the 2L spatial domain vectors, and an $(L+l)^{th}$ row in the coefficient matrix $\tilde{W}$ may correspond to an $l^{th}$ spatial domain vector in a second polarization direction in the 2L spatial domain vectors. An $m^{th}$ column ($0 \leq m \leq M^i-1$, and m is an integer) in the coefficient matrix $\tilde{W}$ may correspond to an $m^{th}$ one of the $M^i$ frequency domain vectors.

Therefore, in the feedback manner of dual-domain compression, a frequency domain vector and a spatial domain vector corresponding to each of the R spatial layers are selected as a position of the spatial-frequency vector pair for constructing the precoding matrix and a spatial-frequency combination coefficient of each spatial-frequency vector pair.

The position of the spatial-frequency vector pair for constructing the precoding matrix is specifically a position of the spatial domain vector for constructing the precoding matrix among the spatial domain vectors reported by the terminal device and a position of the frequency domain vector for constructing the precoding matrix among the frequency domain vectors reported by the terminal device. Because each spatial-frequency vector pair corresponds to one non-zero spatial-frequency combination coefficient (non-zero coefficient for short), the position of the spatial-frequency vector pair for constructing the precoding matrix is also a position of the non-zero coefficient.

It should be understood that the foregoing listed relationships between spatial layers and spatial domain vectors and frequency domain vectors are merely examples, and should not constitute any limitation on this application.

It should be further understood that, the relationship among the spatial-frequency matrix H, $W_1$, and $W_3$ shown above is merely an example, and shall not constitute any limitation on this application. A person skilled in the art may perform mathematical transformation on the foregoing relationship based on a same concept, to obtain another calculation formula used to represent the relationship among the spatial-frequency matrix H, $W_1$, and $W_3$. For example, the spatial-frequency matrix H may also be expressed as $H=W_1 \tilde{W} W_3$. In this case, each row vector in $W_3$ may correspond to one selected frequency domain vector.

In dual-domain compression, compression is performed in both spatial domain and frequency domain. Therefore, when providing a feedback, the terminal device may feedback the one or more selected spatial domain vectors and the one or more selected frequency domain vectors to the network device, and does not need to feedback, based on each frequency domain unit (for example, a subband), a weighting coefficient (for example, including an amplitude and a phase) of the subband. Therefore, feedback overheads can be greatly reduced. In addition, because a frequency domain vector can represent a change rule of a channel in frequency domain, one or more frequency domain vectors are linearly superposed to simulate a change of the channel in frequency domain. In this way, relatively high feedback precision can still be kept, so that a precoding matrix that is restored by the network device based on the feedback of the terminal device can still well adapt to the channel.

It should be understood that, for ease of understanding of dual-domain compression, terms such as the spatial-frequency matrix and the spatial-frequency vector pair are separately defined above. However, this shall not constitute any limitation on this application. A specific process in which the terminal device determines a PMI is an internal implementation behavior of the terminal device. The specific process in which the terminal device determines the PMI is not limited in this application. A specific process in which the network device determines a precoding matrix based on the PMI is an internal implementation behavior of the network device. The specific process in which the network device determines the precoding matrix based on the PMI is not limited in this application either. The terminal device and the network device may separately generate the PMI and restore the precoding matrix by using different algorithms.

With reference to a possible implementation, the following briefly describes a process in which the terminal device reports the precoding matrix based on dual-domain compression.

Using RI=1 and two polarization directions (the horizontal direction and the vertical direction) as an example, precoding matrices corresponding to $N_f$ frequency domain units may be combined into a $2N_1 N_2 \times N_f$ matrix $H=[H_1 \; H_2$ $L H_{N_f}$], where $H_1$ to $H_{N_f}$ are $N_f$ precoding vectors corresponding to the $N_f$ frequency domain units, and $N_1$ and $N_2$ are quantities of antenna ports in the horizontal direction and the vertical direction respectively. A frequency domain length occupied by the frequency domain unit may be a bandwidth of a frequency domain subband, or may be a bandwidth of a frequency domain subband multiplied by f, for example, f=½, f=¼, or may be one RB, two RBs, or four RBs. This is not limited. Further, the precoding matrix H corresponding to the $N_f$ frequency domain units is converted into $H=W_1 \tilde{W} W_3^H$.

$W_1$ is a matrix (dimensions are $2N_1N_2 \times 2L$) formed by selected spatial domain component vectors, and the two polarization directions include 2L spatial domain component vectors in total (column vectors in $W_1$), that is, $$W_1 = \begin{bmatrix} b_s^0 & b_s^1 & \ldots & b_s^{L-1} & 0 & 0 & \ldots & 0 \\ 0 & 0 & \ldots & 0 & b_s^0 & b_s^1 & \ldots & b_s^{L-1} \end{bmatrix},$$

where L is a quantity of spatial domain component vectors selected for each spatial layer and configured by the network device. In an implementation, a same spatial domain component vector is selected for the two polarization directions, where the selected spatial domain component vector $b_s^{I(i)}$ (i=0, 1, ..., L-1) is an $i^{th}$ spatial domain component vector selected in a rotation DFT basis matrix (dimensions are $N_1N_2 \times N_1N_2$), and correspondingly, I(i) I(i) represents an index of the selected spatial domain component vector. A rotation 2D-DFT basis matrix may be represented as follows:

$$B_{N_1,N_2}(q_1,q_2) = (R_{N_1}(q_1)D_{N_1}) \otimes (R_{N_2}(q_2)D_{N_2}),$$

where $D_N$ is an N×N orthogonal DFT matrix, and an element in an $m^{th}$ row and an $n^{th}$ column is $$[D_N]_{m,n} = \frac{1}{\sqrt{N}} e^{\frac{j2\pi mn}{N}} \cdot R_N(q) = \text{diag}\left(\left[e^{j2\pi \cdot 0 \cdot \frac{q}{N}} e^{j2\pi \cdot 1 \cdot \frac{q}{N}} \ldots e^{j2\pi \cdot (N-1) \cdot \frac{q}{N}}\right]\right)$$

represents an N×N rotation matrix. Assuming that rotation factors q are evenly distributed, $$q_1 = \frac{i}{o_1},$$

where i=0, 1, •••, $O_1$–1, and $$q_2 = \frac{i}{o_2},$$

where i=0, 1, •••, $O_2$–1. Correspondingly, a matrix formed by a product of the rotation matrix and the DFT orthogonal matrix satisfies $$[R_N(q)D_N]_{m,n} = \frac{1}{\sqrt{N}} e^{\frac{j2\pi m(n+q)}{N}}.$$

$W_3$ is a matrix formed by selected frequency domain component vectors. The selected frequency domain component vectors may be selected from the predefined DFT basis matrix or the rotation DFT basis matrix (dimensions are $N_f \times N_f$). The network device configures a quantity M of frequency domain component vectors included in $W_3$ corresponding to each spatial layer, where a value of M is related to a quantity $N_f$ of frequency domain units, and $M = \lceil p \cdot N_f \rceil$. A value of p may fall within {½, ¼}. If each spatial domain component vector in one spatial layer corresponds to the same M frequency domain component vectors, dimensions of $W_3^H$ are $M \times N_f$, and each column vector in $W_3$ corresponds to one frequency domain component vector. In this case, the frequency domain component vectors corresponding to each spatial domain component vector are the M frequency domain component vectors in $W_3$.

$\tilde{W}$ is a spatial-frequency combination coefficient matrix, and its dimensions are 2L×M. An $i^{th}$ row in the spatial-frequency combination coefficient matrix $\tilde{W}$ corresponds to an $i^{th}$ one of the 2L spatial domain component vectors, and a $j^{th}$ column in the spatial-frequency combination coefficient matrix $\tilde{W}$ corresponds to a $j^{th}$ one of the M frequency domain component vectors. A spatial-frequency combination coefficient corresponding to the $i^{th}$ spatial domain component vector is an element included in an $i^{th}$ row vector in the spatial-frequency combination coefficient matrix $\tilde{W}$.

To control reporting overheads, the network device configures a maximum quantity $K_0$ ($K_0 \leq 2LM$) of actually reported combination coefficients in $\tilde{W}$ corresponding to each spatial layer. A value of $K_0$ is related to a quantity L of spatial domain component vectors and a quantity M of frequency domain component vectors, and $K_0 = \lceil \beta \cdot 2LM \rceil$. A value of β may fall within {¾, ½, ¼, ⅛}. For example, if each spatial domain component vector corresponds to a same quantity of M frequency domain component vectors, after spatial-frequency compression is performed, the terminal device can report only a maximum of $K_0$ element subsets of 2L×M combination coefficients. In addition, the terminal device may further report only $K_1$ corresponding combination coefficients with non-zero amplitudes and indexes of the $K_1$ elements ($K_1 \leq K_0$) in the $K_0$ combination coefficient subsets. It may be understood that the $K_0$ combination coefficients are subsets of the 2LM combination coefficients, and the actually reported $K_1$ combination coefficients are subsets of the $K_0$ combination coefficients. The indexes of the $K_1$ elements may be indicated by using a bitmap (the bitmap includes 2LM bits).

In summary, for a spatial-frequency compressed codebook, the terminal device needs to report the following information to the network device:

(1) indexes of L spatial domain component vectors included in a matrix $W_1$ corresponding to each spatial layer;

(2) indexes of M frequency domain component vectors included in a matrix $W_5$ corresponding to each spatial layer;

(3) spatial-frequency combination coefficient position indication information corresponding to each spatial layer;

(4) amplitudes of $K_1$ spatial-frequency combination coefficients corresponding to each spatial layer; and (5) phases of the $K_1$ spatial-frequency combination coefficients corresponding to each spatial layer.

In a possible implementation, for a spatial-frequency combination coefficient position corresponding to each spatial layer, the terminal device may select L spatial domain component vectors from $N_1 \times N_2$ candidate spatial domain component vectors for each spatial layer, and indicate, by using a combinatorial number, that indication overheads of $\lceil \log_2 C_{N_1N_2}^L \rceil$ bits are required. Further, the terminal device may indicate a non-zero combination coefficient position in a manner of "window+combinatorial number+bitmap". Assuming that r spatial layers share one window, where $r \in \{1, 2, \cdots, R\}$, a start position of a feedback window requires $\lceil \log_2 N_f \rceil$ bits. Assuming that a quantity of frequency domain component vectors corresponding to each spatial layer is M, a window length is M multiplied by a preconfigured coefficient α. 2L spatial domain component vectors of one spatial layer share one combinatorial number, and indication overheads of the combinatorial number are $r \times \lceil \log_2 C_{\alpha M}^M \rceil$ bits. Each layer occupies one bitmap, and the required indication overheads are r×2L×M bits. Therefore, total indication overheads require $\lceil \log_2 C_{N_1 N_2}^L \rceil + \lceil \log_2 N_f \rceil + r \times \lceil \log_2 C_{\alpha M}^M \rceil + r \times 2L \times M$ bits.

In the foregoing indication manner, if a quantity of candidate spatial domain component vectors and a quantity of candidate frequency domain component vectors are relatively large, relatively large indication overheads are caused, and a frequency domain component vector corresponding to each spatial domain component vector of each spatial layer is separately indicated by using a bitmap. Waste is also caused when a quantity of frequency domain component vectors corresponding to each spatial domain component vector is relatively large. In view of this, this application provides a method, to reduce indication overheads for feeding back positions of spatial-frequency combination coefficients by a terminal device.

For ease of understanding of the embodiments of this application, before the embodiments of this application are described, the following descriptions are first provided.

First, for ease of understanding of the embodiments of this application, the following describes in detail several parameters used in the following embodiments.

$N_s$: a quantity of candidate spatial domain component vectors included in a predefined candidate spatial domain component vector set. $N_s \geq 2$ and is an integer.

In a possible implementation. $N_s = N_1 \times N_2$, where $N_1$ is a quantity of horizontal antennas of a two-dimensional antenna array, and $N_2$ is a quantity of vertical antennas of the two-dimensional antenna array. In another possible implementation, $N_s = O_1 \times N_1 \times O_2 \times N_2$, where $O_1$ is an oversampling factor in a horizontal direction, and $O_2$ is an oversampling factor in a vertical direction.

$N_F$: a quantity of candidate frequency domain component vectors included in a predefined candidate frequency domain component vector set. $N_F \geq 2$ and is an integer.

In a possible implementation, $N_F = N_f$, where $N_f$ is a quantity of frequency domain units included in a CSI reporting bandwidth. In another possible implementation, $N_F = O_f \times N_f$, where $O_f$ is an oversampling factor in frequency domain.

R: a quantity of spatial layers indicated in an RI;

L: a quantity of spatial domain component vectors in each spatial layer. If the quantity of spatial domain component vectors in each spatial layer is different, $L_i$ is a quantity of spatial domain component vectors in an $i^{th}$ spatial layer, and $i \in \{0, 1, \cdots, R-1\}$.

M: a quantity of frequency domain component vectors corresponding to each spatial domain component vector in each spatial layer. If the quantity of frequency domain component vectors corresponding to each spatial domain component vector is different, $M_{i,j}$ is a quantity of frequency domain component vectors corresponding to a $j^{th}$ spatial domain component vector in the $i^{th}$ spatial layer, and $j \in \{0, 1, \cdots, L_i - 1\}$.

$M^i$: a quantity of frequency domain component vectors formed by a union set of the $M_{i,j}$ frequency domain component vectors corresponding to each of the $L_i$ spatial domain component vectors corresponding to the $i^{th}$ spatial layer.

Second, in the embodiments, for ease of description, when numbering is involved, numbers may be consecutive and start from 0. For example, R spatial layers may include a first spatial layer to an $R^{th}$ spatial layer (indexes 0 to R−1), the L spatial domain component vectors may include a first spatial domain component vector to an $L^{th}$ spatial domain component vector (indexes 0 to L−1), and so on. Examples are not exhaustively described herein. Certainly, a specific implementation is not limited thereto. For example, numbers may alternatively be consecutive and start from 1. It should be understood that the foregoing descriptions are all provided for ease of describing the technical solutions provided in the embodiments of this application, but are not intended to limit the scope of this application.

Third, in the embodiments of this application, "used to indicate" may include used for direct indication and used for indirect indication. For example, that the indication information is described as being used to indicate information I may include a direct indication I or an indirect indication I of the indication information, but it does not mean that the indication information necessarily carries I.

The information indicated by the indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or agreed on in advance. For example, specific information may alternatively be indicated by using an arrangement sequence of all information that is agreed on in advance (for example, stipulated in a protocol), to reduce indication overheads to some extent. In addition, a common part of all information may further be identified and indicated together, to reduce indication overheads caused by separately indicating the same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected based on a specific requirement. The selected indication manner is not limited in the embodiments of this application. In this way, the indication manners used in the embodiments of this application should be understood as covering various methods that enable a to-be-indicated party to learn to to-be-indicated information.

In addition, the to-be-indicated information may have another equivalent form. For example, a row vector may be represented as a column vector; a matrix may be represented by using a transpose matrix of the matrix, or a matrix may be represented in a form such as a vector or an array, where the vector or the array may be formed by connecting row vectors or column vectors in the matrix to each other; and a Kronecker product of two vectors may be represented in a form such as a product of a transpose vector of one vector and a transpose vector of another vector. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separately sending, and sending periodicities and/or sending occasions of these pieces of sub-information may be the same or different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but is not limited to, radio resource control signaling, such as radio resource control (RRC) signaling, media access control (MAC) layer signaling, such as a MAC-control element (CE), and physical layer signaling, for example, one or a combination of at least two of downlink control information (DCI).

Fourth, in the embodiments of this application, an example in which both a spatial domain component vector and a frequency domain component vector are column vectors is used to describe the embodiments provided in this application. However, this should not constitute any limitation on this application. Based on a same concept, a person skilled in the art may further figure out more possible representations.

Fifth, a feedback manner in which the terminal device reports CSI may include explicit feedback and implicit feedback. The explicit feedback means that the terminal device feeds back a channel matrix. The implicit feedback means that the terminal device feeds back a precoding matrix. For ease of description in this specification, the implicit feedback is used as an example for description later. However, it should be understood that the channel state information reporting method in the embodiments of this application may also be used in the explicit feedback manner. In the method for reporting channel state information based on explicit feedback, a spatial layer in the method for reporting channel state information based on implicit feedback may be replaced with a receive antenna, that is, a quantity of spatial layers is replaced with a quantity of receive antennas, and a sequence number of a spatial layer is replaced with a sequence number of a receive antenna.

The following describes in detail the method provided in the embodiments of this application with reference to the accompanying drawings.

It should be understood that the method provided in the embodiments of this application may be applied to a system using a multi-antenna technology for communication, for example, the communications system 100 shown in FIG. 1. The communications system may include at least one network device and at least one terminal device. The network device and the terminal device may communicate with each other by using the multi-antenna technology.

It should be understood that, the method provided in the embodiments of this application is not limited to communication between the network device and the terminal device, and may be further applied to communication between terminal devices. A scenario to which the method is applied is not limited in this application. In embodiments shown below, for ease of understanding and description, interaction between the network device and the terminal device is used as an example to describe in detail the method provided in the embodiments of this application.

It should be further understood that, a specific structure of an execution body of a method provided in the embodiments of this application is not specifically limited in the embodiments shown below, provided that a program that records code of the method provided in the embodiments of this application can be run to perform communication according to the method provided in the embodiments of this application. For example, the method provided in the embodiments of this application may be performed by a terminal device or a network device, or a functional module that is in the terminal device or the network device and that can invoke and execute the program.

Figure 2:
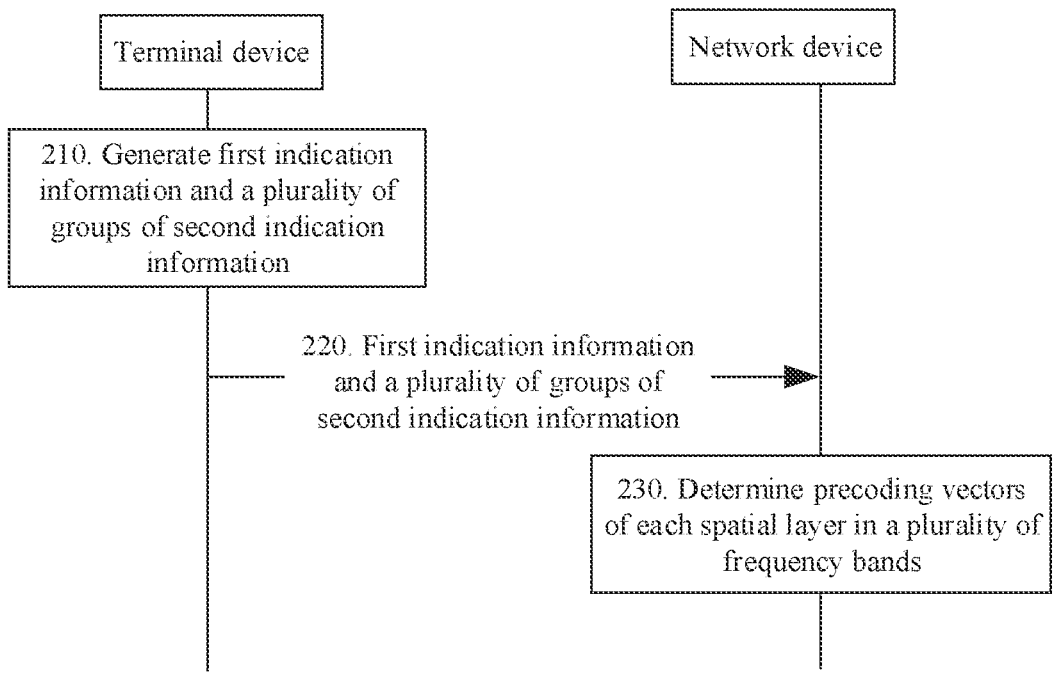
FIG. 2 is a schematic flowchart of a channel state information reporting method according to an embodiment of this application.

FIG. 2 is a schematic flowchart of a channel state information reporting method 200 according to an embodiment of this application from a perspective of device interaction. The method 200 includes the following operations.

S210. A terminal device generates first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector.

S220. The terminal device sends the first indication information and the plurality of groups of second indication information to a network device, and correspondingly, the network device receives the first indication information and the plurality of groups of second indication information.

S230. The network device determines precoding vectors of each spatial layer in a plurality of frequency bands based on the first indication information and the plurality of groups of second indication information.

As described above, an $i^{th}$ spatial layer corresponds to $L_i$ spatial domain component vectors, and a $j^{th}$ one of the $L_i$ spatial domain component vectors corresponds to $M_{i,j}$ frequency domain component vectors. In this embodiment of this application, the first indication information and the plurality of groups of second indication information are used to indicate a position of a spatial-frequency combination coefficient that needs to be reported by the terminal device, that is, indicate at least one frequency domain component vector corresponding to each spatial domain component vector in each spatial layer. Specifically, the first indication information indicates the plurality of frequency domain component vectors, one group of second indication information corresponds to one spatial layer, and one piece of second indication information in the group of second indication information corresponds to one spatial domain component vector in the spatial layer. The second indication information is used to further indicate, from the plurality of frequency domain component vectors indicated by the first indication information, at least one frequency domain component vector corresponding to the spatial domain component vector corresponding to the second indication information.

The foregoing plurality of spatial domain component vectors of one spatial layer and frequency domain component vectors corresponding to each spatial domain component vector are used to construct precoding vectors of one spatial layer in a plurality of frequency bands. However, it should be understood that other parameters are also required to construct the precoding vectors. A manner of indicating the other parameters is not limited in this embodiment of this application.

In this embodiment of this application, the first indication information is used to indicate the plurality of frequency domain component vectors, and the plurality of groups of second indication information are used to indicate at least one of the plurality of frequency domain component vectors for each spatial domain component vector of each spatial layer, to indicate positions of spatial-frequency combination coefficients in a precoding matrix. This helps reduce indication overheads for feeding back the positions of the spatial-frequency combination coefficients by the terminal device and improve CSI feedback efficiency.

In an optional embodiment, the plurality of frequency domain component vectors are continuous, the first indication information is used to indicate a start position $K_2$ of the plurality of frequency domain component vectors and a quantity $M_2$ of the plurality of frequency domain component vectors, $K_2$ is an integer greater than or equal to 0, and $M_2$ is an integer greater than or equal to 2.

The plurality of frequency domain component vectors are continuous. In this embodiment of this application, coverage of the plurality of frequency domain component vectors may also be referred to as a "large window". When feeding back the plurality of frequency domain component vectors, the terminal device may feed back a length of the large window and a start position of the large window. In other words, the start position and the quantity of the plurality of frequency domain component vectors are indicated by using the first indication information. The start position $K_2$ of the plurality of frequency domain component vectors may be understood as an index of a first frequency domain component vector in the plurality of frequency domain component vectors in a candidate frequency domain component vector sequence. Therefore, a value of $K_2$ may be 0 to $N_F-1$. In a possible implementation, because a quantity of candidate frequency domain component vectors is $N_F$, there are a total of $N_F$ possible cases for the start position, and a quantity of bits occupied to indicate the start position $K_2$ of the plurality of frequency domain component vectors is $\lceil \log_2 N_F \rceil$. A quantity of bits occupied to indicate the quantity $M_2$ of the plurality of frequency domain component vectors is $\lceil \log_2 X_2 \rceil$, and $X_2$ represents a quantity of candidate values of $M_2$.

In summary, indication overheads of the first indication information are $\lceil \log_2 N_F \rceil + \lceil \log_2 X_2 \rceil$ bits.

In an optional embodiment, in the first indication information, a quantity of bits occupied to indicate the start position of the plurality of frequency domain component vectors is $\lceil \log_2 M_2 \rceil$, and a frequency domain component vector corresponding to a strongest spatial-frequency component vector corresponding to each spatial layer is always a first frequency domain component vector in a candidate frequency domain component vector sequence.

The strongest spatial-frequency component vector is also referred to as a strongest spatial-frequency pair, and may be understood as a spatial-frequency combination coefficient with a largest amplitude value. It should be understood that the terminal device may shift, to a frequency domain vector of a fixed position (for example, the first frequency domain component vector, also referred to as a fixed index value, for example, an index value 0), a frequency domain component vector corresponding to a spatial-frequency combination coefficient whose amplitude value is the largest among $M^i$ frequency domain component vectors formed by a union set of $M_{i,j}$ frequency domain component vectors corresponding to each of $L_i$ spatial domain component vectors corresponding to the $i^{th}$ spatial layer, and a same cyclic shift is performed on indexes of other $M^i-1$ frequency domain component vectors sequentially. In this embodiment, among $M^i$ frequency domain component vectors corresponding to each spatial layer, a frequency domain component vector corresponding to the strongest spatial-frequency component vector is the first frequency domain component vector (the index value is 0) in the candidate frequency domain component vector sequence.

After the frequency domain component vector corresponding to the strongest spatial-frequency component vector corresponding to each spatial layer is shifted to the first frequency domain component vector in the candidate frequency domain component vector sequence, the terminal device may first determine the quantity $M_2$ of the plurality of frequency domain component vectors, and then select the start position of the plurality of frequency domain component vectors. The plurality of frequency domain component vectors selected by the terminal device needs to include the frequency domain component vector corresponding to the strongest spatial-frequency component vector (the first one located in the candidate frequency domain component vector sequence), and the quantity $M_2$ of the plurality of frequency domain component vectors is known. In this case, there are $M_2$ possible cases for the start position of the plurality of frequency domain component vectors, and the quantity of bits occupied to indicate the start position of the plurality of frequency domain component vectors is $\lceil \log_2 M_2 \rceil$. $M_2$ is less than $N_F$. Therefore, overheads for feeding back the start position of the plurality of frequency domain component vectors can be reduced by the shift.

The reason why the $M^i$ frequency domain component vectors may be reported after the cyclic shift is performed on the $M^i$ frequency domain component vectors is: although the $M^i$ frequency domain component vectors reported by the terminal device are $M^i$ frequency domain component vectors obtained after the cyclic shift, calculation of a CQI by the network device is not affected.

Specifically, in a channel measurement process, the terminal device may select a corresponding frequency domain component vector for each spatial layer based on a currently estimated channel matrix. Assuming that $M^i$ frequency domain component vectors selected for all spatial domain component vectors of the $i^{th}$ ($0 \leq i \leq R-1$, and i is an integer)

spatial layer are $\{v_{f(0)}, v_{f(1)}, \cdots, v_{f(M^i-1)}\}$, a matrix $W_3^H = [v_{f(0)} \, v_{f(1)} \cdots v_{f(M^i-1)}]$ may be constructed, where an index of a $k^{th}$ ($0 \leq k \leq M^i-1$, and k is an integer) frequency domain component vector is f(k). An index value of each of the $M^i$ frequency domain component vectors is adjusted by a fixed offset $\lambda$. For example, a frequency domain component vector $v_{f(k)}$ whose index is f(k) is adjusted to a frequency domain component vector whose index value is $m(k) = mod(f(k)+\lambda, N_3)$. In this case, a new group of frequency domain component vectors $\{v_{m(0)}, v_{m(1)}, \cdots, v_{m(M^i-1)}\}$ may be obtained, and the $M^i$ frequency domain component vectors may be used to construct a matrix $\hat{W}_3^H = [v_{m(0)} \, v_{m(1)} \cdots v_{M(M^i-1)}]$. In a spatial-frequency matrix restored by the network device by using $H = W_1 \tilde{W} W_3^H$ and a spatial-frequency matrix restored by the network device by using $H = W_1 \tilde{W} \hat{W}_3^H$, there is only a difference of one fixed phase for a precoding matrix corresponding to each frequency domain unit, and CQI calculation is not affected. Therefore, adverse impact on system performance can be ignored. In other words, reporting the $M^i$ frequency domain vectors $\{v_{f(0)}, v_{f(1)}, \cdots, v_{f(M_{i,j}-1)}\}$ by the terminal device is equivalent to reporting the $M^i$ frequency domain vectors $\{v_{m(0)}, v_{m(1)}, \cdots, v_{m(M_{i,j}-1)}\}$. Reasons are as follows:

$$v_{f(k)+\lambda} = \left[1 e^{-\frac{j2\pi(f(k)+\lambda)}{N_f}} \cdots e^{-\frac{j2\pi(f(k)+\lambda)(N_f-1)}{N_f}}\right] =$$

$$\underbrace{\left[1 e^{-\frac{j2\pi(f(k))}{N_f}} \cdots e^{-\frac{j2\pi(f(k))(N_f-1)}{N_f}}\right]}_{v_{f(k)}} \times \begin{bmatrix} 1 \\ e^{-j2\pi\lambda\frac{1}{N_f}} \\ \ddots \\ e^{-j2\pi\lambda\frac{N_f-1}{N_f}} \end{bmatrix}.$$

Therefore, the terminal device may use a frequency domain component vector obtained after an index value is cyclically shifted to replace a frequency domain component vector before the cyclic shift. For example, the frequency domain component vector whose index value is m(k), obtained after the cyclic shift, is used to replace the frequency domain component vector whose index value is f(k).

In an optional embodiment, if $K_2 + M_2 \leq N_F$, indexes of the plurality of frequency domain component vectors are $K_2$ to $K_2 + M_2 - 1$; or if $K_2 + M_2 > N_F$, indexes of the plurality of frequency domain component vectors are $K_2$ to $N_F - 1$ and 0 to $(K_2 + M_2 - 1) \bmod N_F$, where $N_F$ is a quantity of candidate frequency domain component vectors, $N_F$ is an integer greater than or equal to 2, and the plurality of frequency domain component vectors are selected from the $N_F$ candidate frequency domain component vectors.

The plurality of continuous frequency domain component vectors in this embodiment of this application have a "cyclic" feature. To be specific, in the candidate frequency domain component vector sequence including the $N_F$ candidate frequency domain component vectors, if a length of a large window exceeds a tail of the sequence, a remaining length of the window covers a head of the sequence. Using $N_F = 10$ as an example (the indexes of the 10 candidate frequency domain component vectors are 0 to 9 sequentially), if the start position and the quantity of the plurality of continuous frequency domain component vectors are $K_2 = 3$ and $M_2 = 5$ respectively, indexes of five frequency domain component vectors corresponding to the length of the large window are 3 to 7 sequentially. If the start position and the quantity of the plurality of continuous frequency domain component vectors are $K_2 = 8$ and $M_2 = 5$ respectively, indexes of five frequency domain component vectors corresponding to the length of the large window are 8 to 9 and 0 to 2 sequentially. The foregoing cyclic feature can make the length of the large window as small as possible, so that fewer bits are used to indicate the start position and the window length of the large window, thereby reducing reporting overheads of the terminal device.

In an optional embodiment, each piece of second indication information is used to indicate a plurality of groups of at least one continuous frequency domain component vector.

In this embodiment of this application, coverage of a group of at least one continuous frequency domain component vector is referred to as a "small window". One piece of second indication information may indicate a plurality of small windows. One piece of second indication information corresponds to one spatial domain component vector of one spatial layer. Therefore, one spatial domain component vector corresponds to a plurality of small windows, and frequency domain component vectors included in the plurality of small windows are frequency domain component vectors corresponding to the spatial domain component vector. As described above, the $i^{th}$ spatial layer corresponds to the $L_i$ spatial domain component vectors, and $j^{th}$ one of the $L_i$ spatial domain component vectors corresponds to $M_{i,j}$ frequency domain component vectors. The $M_{i,j}$ frequency domain component vectors are all frequency domain component vectors included in a plurality of small windows indicated by second indication information corresponding to the $j^{th}$ spatial domain component vector. Because the plurality of small windows are selected from the plurality of frequency domain component vectors indicated by the first indication information, the small windows are all included in a large window, and one large window may include a plurality of small windows. In this embodiment of this application, indication overheads for feeding back the positions of the spatial-frequency combination coefficients by the terminal device are reduced by using a combination of large window reporting and small window reporting.

In an optional embodiment, each piece of second indication information includes second position indication information and a plurality of pieces of second sub indication information, the second position indication information is used to indicate a plurality of start positions of the plurality of groups of at least one continuous frequency domain component vector, and each piece of second sub indication information in the plurality of pieces of second sub indication information is used to indicate a quantity of at least one continuous frequency domain component vector in each of the plurality of groups of at least one continuous frequency domain component vector.

It should be understood that the second position indication information indicates, by using one piece of indication information, a plurality of start positions of a plurality of groups of at least one continuous frequency domain component vector corresponding to one piece of second indication information. "The plurality of groups of at least one continuous frequency domain component vector" means that there are a plurality of groups of at least one continuous frequency domain component vector. For example, two continuous frequency domain component vectors are a first group, and five continuous frequency domain component vectors are a second group. Assuming that there are five groups of at least one continuous frequency domain component vector, the second position indication information indicates five start positions of the five groups of at least one continuous frequency domain component vector.

Using a group of second indication information (including $L_i$ pieces of second indication information) corresponding to the $i^{th}$ spatial layer as an example, a quantity of a plurality of pieces of second sub indication information included in each piece of second indication information may be the same, or may be different. A quantity of pieces of second sub indication information included in $j^{th}$ piece of second indication information is $N_{i,j}$ (that is, the $j^{th}$ piece of second indication information indicates $N_{i,j}$ groups of at least one continuous frequency domain component vector, corresponding to $N_{i,j}$ small windows). In this case, a quantity of bits occupied to indicate $N_{i,j}$ start positions of the $N_{i,j}$ small windows by second position indication information in the $j^{th}$ piece of second indication information is $\lceil \log_2 C_{i,j} \rceil$, where $C_{i,j}$ is a quantity of cases in which $N_{i,j}$ frequency domain component vectors are selected from the $M_2$ frequency domain component vectors and a spacing between any two of the $N_{i,j}$ frequency domain component vectors is greater than or equal to D, and D is an integer greater than or equal to 1. D may be preconfigured by the network device or prescribed by a protocol. Optionally, if D≥2, a last one of the $N_{i,j}$ frequency domain component vectors is different from a last one of the $M_2$ frequency domain component vectors. In addition, a spacing between the last one of the $N_{i,j}$ frequency domain component vectors and the last one of the $M_2$ frequency domain component vectors is greater than or equal to D−2, and $$C_{i,j} = \frac{(M_2 + 1 - N_{i,j}D)!}{N_{i,j}![M_2 + 1 - N_{i,j}(D+1)]!},$$

where ! represents a factorial. It should be understood that, in this embodiment of this application, a large window and a small window have a cyclic shift feature. The last one of the $M_2$ frequency domain component vectors refers to a last frequency domain component vector included in the large window. The last one of the $N_{i,j}$ frequency domain component vectors refers to a start position of a last small window in the large window. For example, it is assumed that one piece of second indication information is used to indicate three groups of at least one continuous frequency domain component vector, and includes three pieces of second sub indication information. In this case, the three groups of at least one continuous frequency domain component vector correspond to three start positions. Assuming that $C_{i,j}=2$ can be obtained based on the foregoing formula, candidates of the three start positions include {0, 3, 5} and {1, 3, 7}, and second position indication information included in the second indication information may be $\lceil \log_2 2 \rceil = 1$ bits. For example, when the second position indication information is 0, it indicates that the three start positions are {0, 3, 5}, or when the second position indication information is 1, it indicates that the three start positions are {1, 3, 7}.

A quantity of bits occupied by each of the $N_{i,j}$ pieces of second sub indication information to indicate a quantity $M_{i,j,q}$ of $M_{i,j,q}$ continuous frequency domain component vectors is $$\sum_{q=1}^{N_{i,j}} \lceil \log_2 X_{i,j,q} \rceil,$$

where $X_{i,j,q}$ is a quantity of candidate values of $M_{i,j,q}$. Herein, $X_{i,j,q}$ should be selected when $M_{i,j,q}$ frequency domain component vectors indicated by a $q^{th}$ piece of second sub indication information and $M_{i,j,q+1}$ frequency domain component vectors indicated by a $(q+1)^{th}$ piece of second sub indication information are discontinuous. For example, under a prerequisite that the three start positions indicated by the second position indication information are {0, 3, 5}, for a first piece of second sub indication information, to ensure that a frequency domain component vector indicated by the first piece of second sub indication information and a frequency domain component vector indicated by a second piece of second sub indication information are discontinuous, a quantity of frequency domain component vectors indicated by the first piece of second sub indication information can only be 1 or 2, a corresponding index is {0} or {0, 1}, and a quantity of bits occupied by the first piece of second sub indication information is $\lceil \log_2 2 \rceil = 1$.

In summary, indication overheads of one piece of second indication information are $$\lceil \log_2 C_{i,j} \rceil + \sum_{q=1}^{N_{i,j}} \lceil \log_2 X_{i,j,q} \rceil \text{ bits}.$$

It should be understood that feedback in the foregoing manner is needed in each piece of second indication information in each group of second indication information.

It should be further understood that at least one continuous frequency domain component vector corresponding to a small window in this embodiment of this application also has a "cyclic" feature. To be specific, in a large window including a start position $K_2$ and a window length $M_2$, if a length of the small window exceeds a tail of the large window, a remaining length of the small window covers a head of the large window. Because a cyclic feature of the small window is similar to that of the large window, details are not described herein again.

In all the foregoing embodiments, a frequency domain component vector is selected for each spatial domain component vector corresponding to each spatial layer under a prerequisite that a plurality of spatial domain component vectors corresponding to each spatial layer are determined. For the plurality of spatial domain component vectors corresponding to each spatial layer, the terminal device may report the plurality of spatial domain component vectors by using third indication information and a plurality of pieces of fourth indication information described hereinafter, or in another manner. This is not limited in this embodiment of this application.

Figure 3:
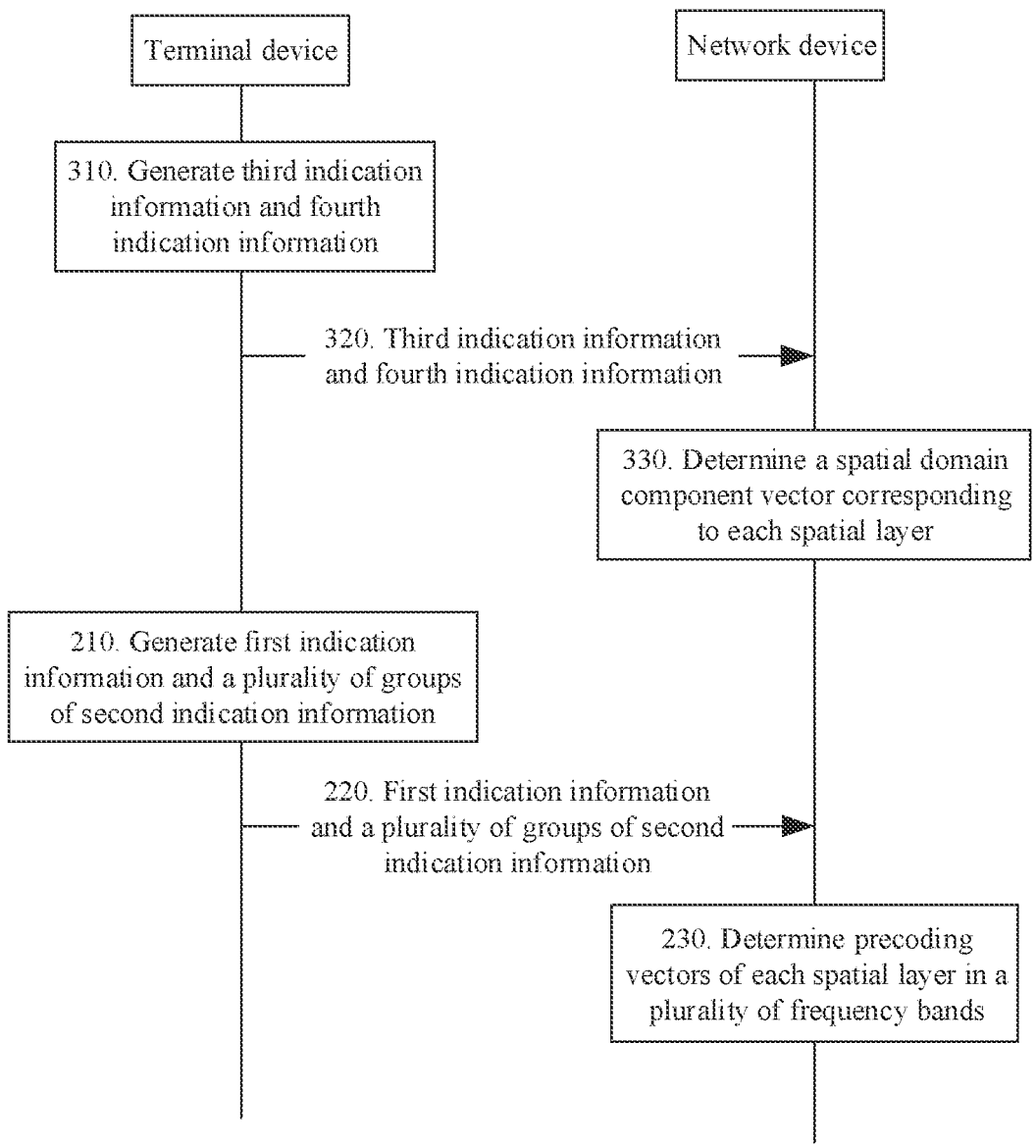
FIG. 3 is a schematic flowchart of another channel state information reporting method according to an embodiment of this application.

FIG. 3 is a schematic flowchart of a channel state information reporting method 300 according to another embodiment of this application. As shown in FIG. 3, before S230, the method 300 further includes.

S310. A terminal device generates third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer.

S320. The terminal device sends the third indication information and the plurality of pieces of fourth indication information to a network device, and correspondingly, the network device receives the third indication information and the plurality of pieces of fourth indication information.

S330. The network device determines, based on the third indication information and the plurality of pieces of fourth indication information, a spatial domain component vector corresponding to each spatial layer.

Specifically, the third indication information indicates the plurality of pieces of spatial domain component vectors, and one piece of fourth indication information corresponds to one spatial layer. Therefore, an $i^{th}$ piece of fourth indication information in the plurality of pieces of fourth indication information is used to indicate, from the plurality of spatial domain component vectors, $L_i$ spatial domain component vectors corresponding to an $i^{th}$ spatial layer. The network device may determine, based on the third indication information and the plurality of pieces of fourth indication information, the spatial domain component vector corresponding to each spatial layer, and then perform S230 to determine precoding vectors of each spatial layer in a plurality of frequency bands.

It should be noted that, S330 needs to be performed before S230, and S310 needs to be performed before S210. However, an order of S220 and S320 is not limited in this embodiment of this application. To be specific, S320 may be performed before S220, or may be performed after S220, or may be performed with S220 simultaneously. In addition, S330 may be performed after S320, or may be performed after S220. This is not limited in this embodiment of this application.

In an optional embodiment, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

The plurality of spatial domain component vectors are continuous. In this embodiment of this application, coverage of the plurality of spatial domain component vectors may also be referred to as a "large window". When feeding back the plurality of spatial domain component vectors, the terminal device may feed back a length of the large window and a start position of the large window. This is similar to feedback of the frequency domain component vectors. In other words, the start position and the quantity of the plurality of spatial domain component vectors are indicated by using the third indication information. The start position $K_1$ of the plurality of spatial domain component vectors may be understood as an index of a first spatial domain component vector in the plurality of spatial domain component vectors in a candidate spatial domain component vector sequence. Therefore, a value of $K_1$ may be 0 to $N_s$. In a possible implementation, because a quantity of candidate spatial domain component vectors is $N_s$, there are a total of $N_s$ possible cases for the start position, and a quantity of bits occupied to indicate the start position of the $M_1$ continuous spatial domain component vectors is $\lceil \log_2 N_s \rceil$. The quantity of bits occupied to indicate the quantity $M_1$ of the $M_1$ continuous spatial domain component vectors is $\lceil \log_2 X_1 \rceil$, and $X_1$ is a quantity of values of $M_1$. In summary, indication overheads of the third indication information are $\lceil \log_2 N_s \rceil + \lceil \log_2 X_1 \rceil$.

In an optional embodiment, if $K_1+M_1 \leq N_s$, indexes of the plurality of spatial domain component vectors are $K_1$ to $K_1+M_1-1$; or if $K_1+M_1 > N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

The plurality of continuous spatial domain component vectors in this embodiment of this application have a "cyclic" feature. To be specific, in the candidate spatial domain component vector sequence including the $N_s$ candidate spatial domain component vectors, if a length of a large window exceeds a tail of the sequence, a remaining length of the window covers a head of the sequence. Using $N_s=10$ as an example (the indexes of the 10 candidate spatial domain component vectors are 0 to 9 sequentially), if the start position and the quantity of the plurality of continuous spatial domain component vectors are $K_1=3$ and $M_1=5$ respectively, indexes of five spatial domain component vectors corresponding to the length of the large window are 3 to 7 sequentially. If the start position and the quantity of the plurality of continuous spatial domain component vectors are $K_1=8$ and $M_1=5$ respectively, indexes of five spatial domain component vectors corresponding to the length of the large window are 8 to 9 and 0 to 2 sequentially. The foregoing cyclic feature can make the length of the large window as small as possible, so that fewer bits are used to indicate the start position and the window length of the large window, thereby reducing reporting overheads of the terminal device.

In an optional embodiment, each piece of fourth indication information is used to indicate a plurality of groups of at least one continuous spatial domain component vector.

In this embodiment of this application, coverage of a group of at least one continuous spatial domain component vector is referred to as a "small window", and one piece of fourth indication information may indicate a plurality of small windows. The $L_i$ spatial domain component vectors corresponding to the $i^{th}$ spatial layer are all spatial domain component vectors included in a plurality of small windows indicated by fourth indication information corresponding to the $i^{th}$ spatial layer. Because the plurality of small windows are selected from the plurality of spatial domain component vectors indicated by the third indication information, the small windows are all included in a large window, and one large window may include a plurality of small windows. In this embodiment of this application, indication overheads for feeding back the positions of the spatial-frequency combination coefficients by the terminal device are reduced by using a combination of large window reporting and small window reporting.

In an optional embodiment, each piece of fourth indication information includes fourth position indication information and a plurality of pieces of fourth sub indication information, the fourth position indication information is used to indicate a plurality of start positions of the plurality of groups of at least one continuous fourth domain component vector, and each piece of fourth sub indication information in the plurality of pieces of fourth sub indication information is used to indicate a quantity of at least one continuous spatial domain component vector in each of the plurality of groups of at least one continuous spatial domain component vector.

It should be understood that the fourth position indication information indicates, by using one piece of indication information, a plurality of start positions of a plurality of groups of at least one continuous spatial domain component vector corresponding to one piece of fourth indication information. "The plurality of groups of at least one continuous spatial domain component vector" means that there are a plurality of groups of at least one continuous spatial domain component vector. For example, two continuous spatial domain component vectors are a first group, and five continuous spatial domain component vectors are a second group. Assuming that there are five groups of at least one continuous spatial domain component vector, the fourth position indication information indicates five start positions of the five groups of at least one continuous spatial domain component vector.

A quantity of a plurality of start positions indicated by fourth position indication information in fourth indication information corresponding to each spatial layer may be the same, or may be different. The fourth indication information corresponding to the $i^{th}$ spatial layer is used as an example. Fourth position indication information in the fourth indication information indicates $N_i$ start positions (that is, the fourth position indication information indicates $N_i$ groups of at least one continuous spatial domain component vector, corresponding to $N_i$ small windows), and a quantity of bits occupied to indicate $N_i$ start positions of the $N_i$ small windows by the fourth position indication information is $\lceil \log_2 C_i \rceil$, where $C_i$ is a quantity of cases in which $N_i$ spatial domain component vectors are selected from the $M_1$ spatial domain component vectors and a spacing between any two of the $N_i$ spatial domain component vectors is greater than or equal to D', and D' is an integer greater than or equal to 1. D' may be preconfigured by the network device or prescribed by a protocol. Optionally, if D'≥2, a last one of the $N_i$ spatial domain component vectors is different from a last one of the $M_1$ spatial domain component vectors. In addition, a spacing between the last one of the $N_i$ spatial domain component vectors and the last one of the $M_1$ spatial domain component vectors is greater than or equal to D'−2, and $$C_i = \frac{(M_1 + 1 - N_i D')!}{N_i![M_1 + 1 - N_i(D' + 1)]!},$$

where ! represents a factorial. It should be understood that, in this embodiment of this application, a large window and a small window have a cyclic shift feature. The last one of the $M_1$ spatial domain component vectors refers to a last spatial domain component vector included in the large window. The last one of the $N_i$ spatial domain component vectors refers to a start position of a last small window in the large window. For example, it is assumed that one piece of fourth indication information is used to indicate three groups of at least one continuous spatial domain component vector. In this case, the three groups of at least one continuous spatial domain component vector correspond to three start positions. Assuming that $C_i$=4 can be obtained based on the foregoing formula, candidates of the three start positions include {0, 2, 5}, {1, 4, 6}, {2, 5, 6}, and {1, 3, 7}, and fourth position indication information included in the fourth indication information may be $\lceil \log_2 4 \rceil$=2 bits. For example, when the fourth position indication information is 00, it indicates that the three start positions are {0, 2, 5}; when the fourth position indication information is 01, it indicates that the three start positions are {1, 4, 6}; when the fourth position indication information is 10, it indicates that the three start positions are {2, 5, 6}; or when the fourth position indication information is 11, it indicates that the three start positions are {1, 3, 7}.

For indication overheads of the plurality of pieces of fourth sub indication information included in the fourth indication information, this embodiment of this application may include the following two cases.

Case 1: A quantity of a plurality of pieces of fourth sub indication information included in one piece of fourth indication information is equal to a quantity of a plurality of start positions indicated by fourth position indication information in the fourth indication information.

In this case, because the quantity of the plurality of start positions is $N_i$, the quantity of fourth sub indication information is also $N_i$. A quantity of bits occupied by each of the $N_i$ pieces of fourth sub indication information to indicate a quantity $M_{i,p}$ of $M_{i,p}$ continuous spatial domain component vectors is $$\sum_{p=1}^{N_i} \lceil \log_2 X_{i,p} \rceil,$$

where $X_{i,p}$ is a quantity of candidate values of $M_{i,p}$. Herein, $X_{i,p}$ should be selected when $M_{i,p}$ spatial domain component vectors indicated by a $p^{th}$ piece of fourth sub indication information and $M_{i,p+1}$ spatial domain component vectors indicated by a $(p+1)^{th}$ piece of fourth sub indication information are discontinuous. For example, under a prerequisite that the three start positions indicated by the fourth position indication information are {1, 4, 6}, for a first piece of fourth sub indication information, to ensure that a spatial domain component vector indicated by the first piece of fourth sub indication information and a spatial domain component vector indicated by a second piece of fourth sub indication information are discontinuous, a quantity of spatial domain component vectors indicated by the first piece of fourth sub indication information can only be 1 or 2, corresponding index is {1} or {1, 2}, and a quantity of bits occupied by the first piece of fourth sub indication information is $\lceil \log_2 2 \rceil$=1.

In summary, indication overheads of one piece of fourth indication information are $$\lceil \log_2 C_i \rceil + \sum_{p=1}^{N_i} \lceil \log_2 X_{i,p} \rceil \text{ bits.}$$

Case 2: A quantity of spatial domain component vectors indicated by each piece of fourth indication information is L, and a quantity of a plurality of pieces of fourth sub indication information included in one piece of fourth indication information is equal to a quantity of a plurality of start positions indicated by fourth position indication information in the fourth indication information minus one, where L is a preconfigured or predefined integer greater than 1.

In this case, quantities of spatial domain component vectors corresponding to all spatial layers are equal (all are L), L is a preconfigured or predefined integer, and the terminal device does not need to report. For each spatial layer, the terminal device may spare a window length of one small window during reporting, to reduce indication overheads of the fourth indication information.

Specifically, because the quantity of the plurality of start positions is $N_i$, the quantity of fourth sub indication information is $N_i$−1. A quantity of bits occupied by each of the $N_i$−1 pieces of fourth sub indication information to indicate a quantity $M_{i,p}$ of $M_{i,p}$ continuous spatial domain component vectors is $$\sum_{p=1, p\neq J}^{N_i} \lceil \log_2 X_{i,p} \rceil,$$

where $X_{i,p}$ is a quantity of candidate values of $M_{i,p}$, $p \in \{1, 2, \cdots N_i\}$, and $p \neq J$. Herein. J may be any integer in $\{1, 2, \cdots N_i\}$, or may be a preconfigured or predefined integer. This is not limited in this embodiment of this application. A principle of selecting $X_{i,p}$ is the same as that in the foregoing case 1. For brevity, details are not described herein again.

In summary, indication overheads of one piece of fourth indication information are $$\lceil \log_2 C_i \rceil + \sum_{p=1, p\neq J}^{N_i} \lceil \log_2 X_{i,p} \rceil \text{ bits.}$$

It should be understood that feedback in the foregoing manner is needed in each piece of fourth indication information.

It should be further understood that at least one continuous spatial domain component vector corresponding to a small window in this embodiment of this application also has a "cyclic" feature. To be specific, in a large window including a start position $K_1$ and a window length $M_1$, if a length of the small window exceeds a tail of the large window, a remaining length of the small window covers a head of the large window. Because a cyclic feature of the small window is similar to that of the large window, details are not described herein again.

Figure 4:
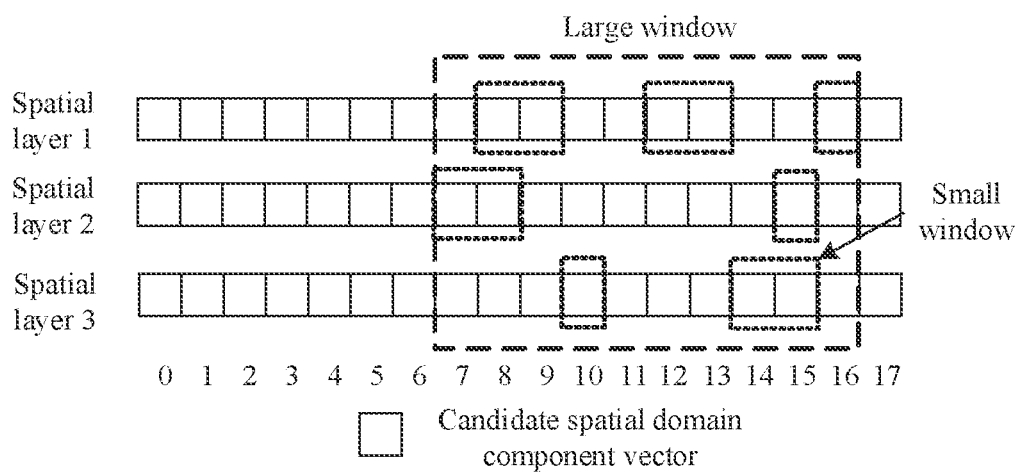
FIG. 4 is a schematic diagram of a manner of indicating spatial domain component vectors according to an embodiment of this application.
Figure 5:
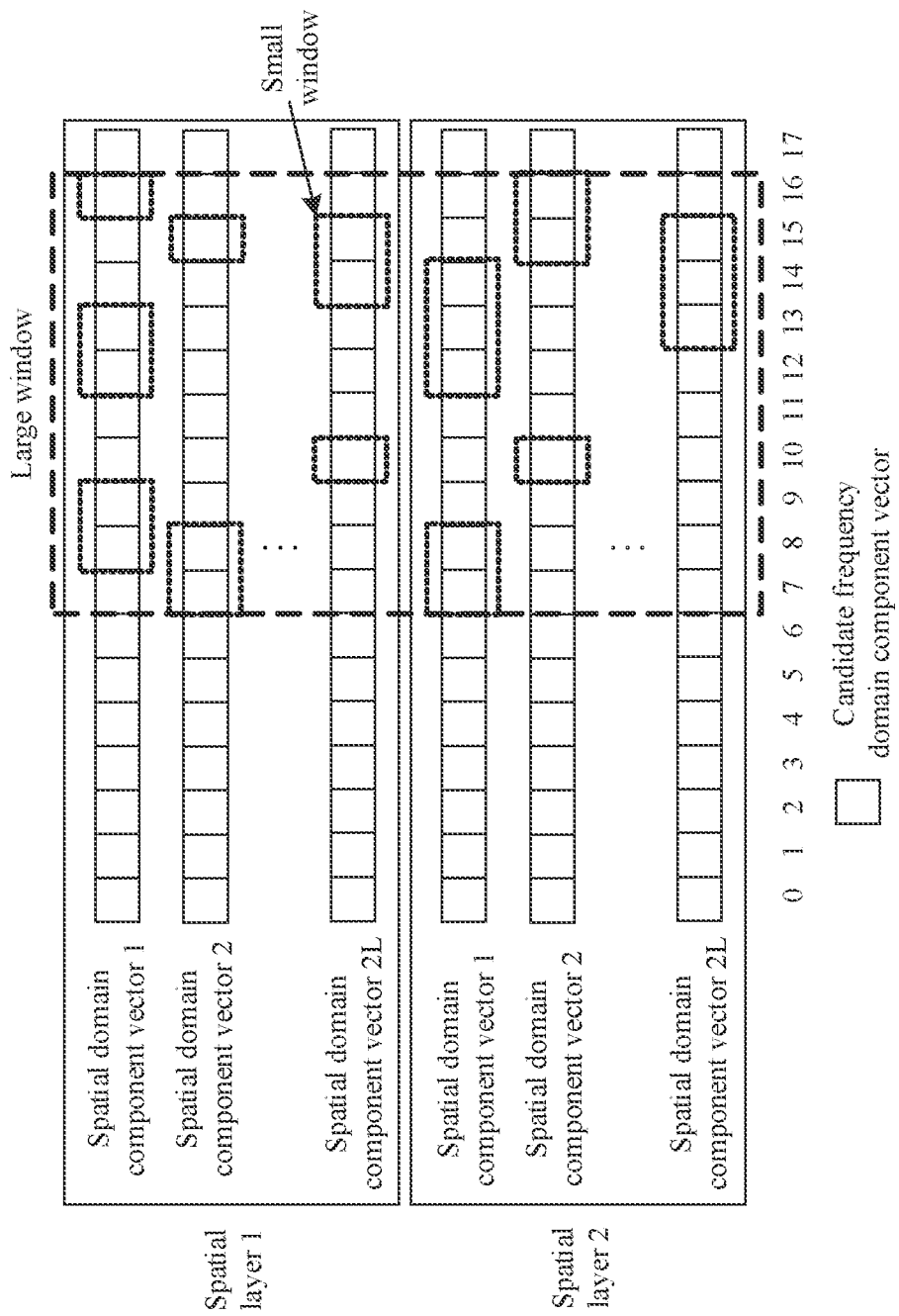
FIG. 5 is a schematic diagram of a manner of indicating frequency domain component vectors according to an embodiment of this application.
Figure 6:
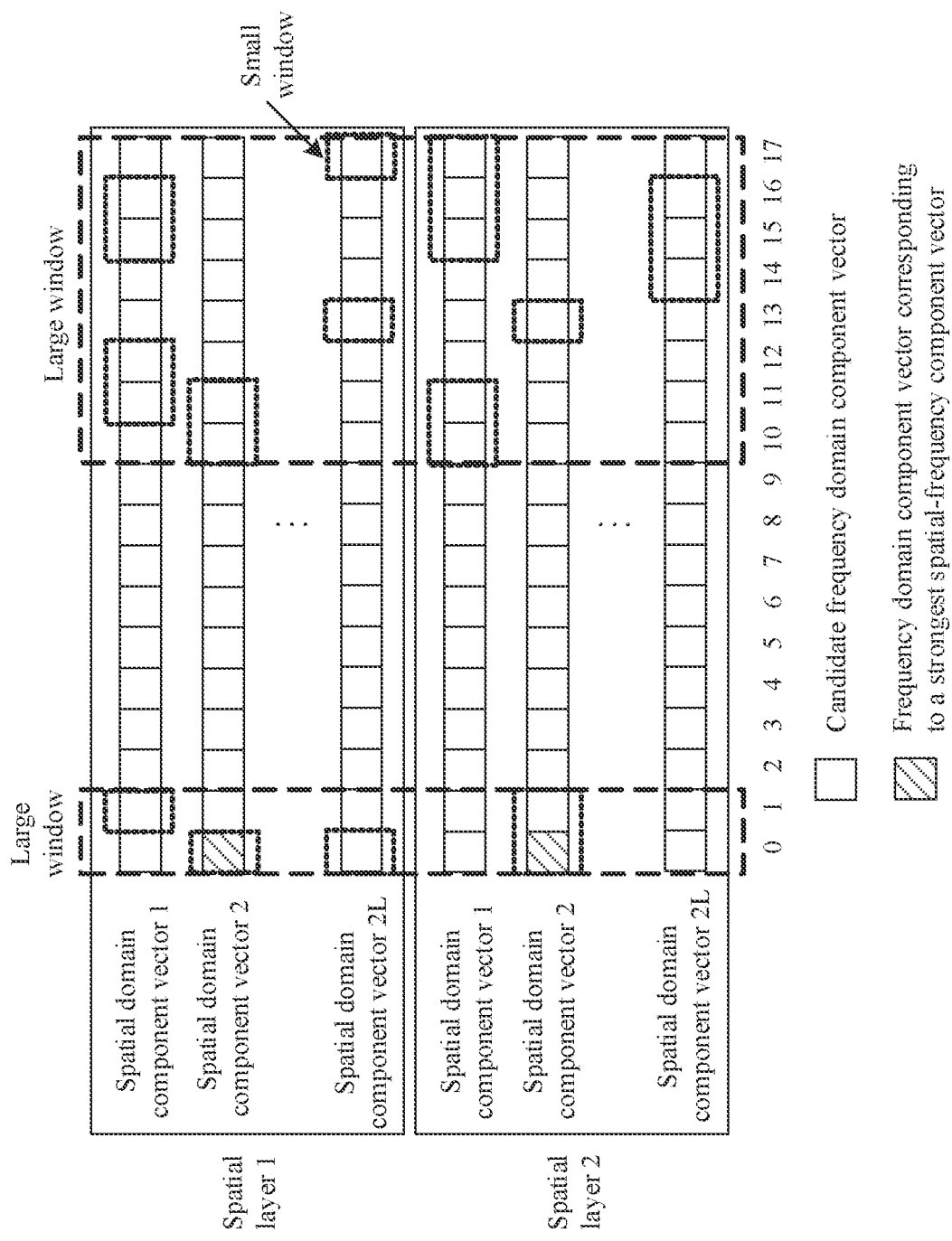
FIG. 6 is a schematic diagram of another manner of indicating frequency domain component vectors according to an embodiment of this application.

For ease of understanding, the following describes in detail large window and small window reporting manners in this embodiment of this application with reference to FIG. 4 to FIG. 6.

FIG. 4 is a schematic diagram of a manner of indicating spatial domain component vectors according to an embodiment of this application. In FIG. 4, it is assumed that three spatial layers share one large window. A quantity of candidate spatial domain component vectors is $N_s=18$.

If a start position of the large window is $K_1=7$ and a window length of the large window is $M_1=10$, indication overheads of third indication information are $\lceil \log_2 18 \rceil + \lceil \log_2 X_1 \rceil$ bits, where $X_1$ is a quantity of candidate values of the window length of the large window.

A spatial layer 1 corresponds to three small windows, and indication overheads of fourth indication information corresponding to the spatial layer 1 are $$\lceil \log_2 C_1 \rceil + \sum_{p=1}^{3} \lceil \log_2 X_{1,p} \rceil,$$

where $C_1$ is a quantity of cases in which three spatial domain component vectors are selected from 10 spatial domain component vectors and a spacing between any two of the three spatial domain component vectors is greater than or equal to 1: $X_{1,1}$ is a quantity of candidate values of a window length of a first one of the three small windows; $X_{1,2}$ is a quantity of candidate values of a window length of a second one of the three small windows; and $X_{1,3}$ is a quantity of candidate values of a window length of a third one of the three small windows. Other spatial layers are similar to the foregoing spatial layer 1. Details are not described herein again.

Therefore, indication overheads for feeding back a spatial domain component vector corresponding to each spatial layer by the terminal device are total bit overheads required for feeding back the start position and the window length of the large window and a start position and a window length of each small window corresponding to each spatial layer.

It is assumed that a quantity of spatial domain component vectors indicated for each spatial layer by using the foregoing FIG. 4 is L, and for two polarization directions, each spatial layer corresponds to 2L spatial domain component vectors. On this basis, FIG. 5 is a schematic diagram of a manner of indicating frequency domain component vectors according to an embodiment of this application.

In FIG. 5, it is assumed that two spatial layers share one large window, and a quantity of candidate frequency domain component vectors is $N_F=18$.

If a start position of the large window is $K_2=7$ and a window length of the large window is $M_2=10$, indication overheads of first indication information are $\lceil \log_2 18 \rceil + \lceil \log_2 X_2 \rceil$ bits, where $X_2$ is a quantity of candidate values of the window length of the large window.

A spatial domain component vector 1 of the spatial layer 1 corresponds to three small windows, and indication overheads of second indication information corresponding to the spatial domain component vector 1 are $$\lceil \log_2 C_{1,1} \rceil + \sum_{p=1}^{3} \lceil \log_2 X_{1,1,q} \rceil,$$

where $C_{1,1}$ is a quantity of cases in which three frequency domain component vectors are selected from 10 frequency domain component vectors and a spacing between any two of the three frequency domain component vectors is greater than or equal to 1; $X_{1,1,1}$ is a quantity of candidate values of a window length of a first one of the three small windows; $X_{1,1,2}$ is a quantity of candidate values of a window length of a second one of the three small windows; and $X_{1,1,3}$ is a quantity of candidate values of a window length of a third one of the three small windows. Other spatial domain component vectors of the spatial layer 1 are similar to the foregoing spatial domain component vector 1, and other spatial layers are similar to the foregoing spatial layer 1. Details are not described herein again.

Therefore, indication overheads for feeding back a frequency domain component vector corresponding to each spatial domain component vector of each spatial layer by the terminal device are total bit overheads required for feeding back the start position and the window length of the large window and a start position and a window length of each small window corresponding to each frequency domain component vector.

FIG. 6 is a schematic diagram of another manner of indicating frequency domain component vectors according to an embodiment of this application. Same as FIG. 5, in FIG. 6, it is assumed that two spatial layers share one large window, and a quantity of candidate frequency domain component vectors is $N_F=18$. A manner of indicating a small window is similar to that in FIG. 5. Details are not described herein again.

A difference from FIG. 5 lies in that in FIG. 6, before the large window and the small window are selected, shift processing is performed on a frequency domain component vector corresponding to a strongest spatial-frequency component vector of each spatial layer, that is, it is ensured that the frequency domain component vector corresponding to the strongest spatial-frequency component vector of each spatial layer is always a first frequency domain component vector (an index is 0) in a candidate frequency domain component vector sequence. In this case, if the window length of the large window is $M_2=10$, indication overheads of first indication information are $\lceil \log_2 10 \rceil + \lceil \log_2 X_2 \rceil$ bits, where $X_2$ is a quantity of candidate values of the window length of the large window. Therefore, compared with the indication manner in FIG. 5, the indication manner in FIG. 6 can reduce bit overheads of the first indication information.

In addition, FIG. 6 shows the cyclic shift feature of the large window and small window. This feature can also reduce the window length to some extent, thereby reducing bit overheads of the first indication information and second indication information.

Figure 7:
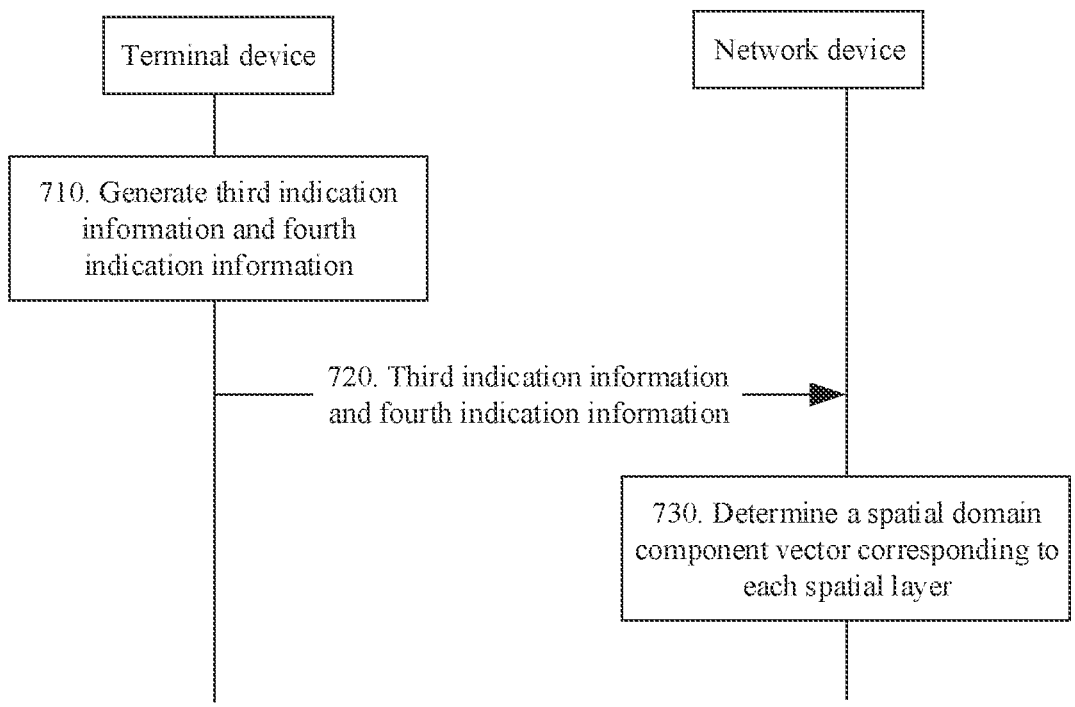
FIG. 7 is a schematic flowchart of a channel state information reporting method according to another embodiment of this application.

FIG. 7 is a schematic flowchart of a channel state information reporting method 700 according to another embodiment of this application. As shown in FIG. 7, the method 700 includes the following operations.

S710. A terminal device generates third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer.

S720. The terminal device sends the third indication information and the plurality of pieces of fourth indication information to a network device, and correspondingly, the network device receives the third indication information and the plurality of pieces of fourth indication information.

S730. The network device determines, based on the third indication information and the plurality of pieces of fourth indication information, a spatial domain component vector corresponding to each spatial layer.

In this embodiment of this application, the third indication information is used to indicate the plurality of spatial domain component vectors, and the plurality of pieces of fourth indication information are used to indicate at least one of the plurality of spatial domain component vectors for each spatial layer, to indicate spatial domain component vectors corresponding to each spatial layer. This helps reduce indication overheads for feeding back positions of the spatial domain component vectors by the terminal device and improve CSI feedback efficiency.

For descriptions about the method 700, refer to the method 300. For brevity, details are not described herein again.

Optionally, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

Optionally, if $K_1+M_1 \leq N_s$, indexes of the plurality of spatial domain component vectors are $K_1$ to $K_1+M_1-1$, or if $K_1+M_1>N_s$, indexes of the plurality of spatial domain component vectors are $K_1$ to $N_s-1$ and 0 to $(K_1+M_1-1) \mod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

Optionally, each piece of fourth indication information is used to indicate a plurality of groups of at least one continuous spatial domain component vector.

Optionally, each piece of fourth indication information includes fourth position indication information and a plurality of pieces of fourth sub indication information, the fourth position indication information is used to indicate a plurality of start positions of the plurality of groups of at least one continuous fourth domain component vector, and each piece of fourth sub indication information in the plurality of pieces of fourth sub indication information is used to indicate a quantity of at least one continuous spatial domain component vector in each of the plurality of groups of at least one continuous spatial domain component vector.

Optionally, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

It should be understood that, in the foregoing embodiments, the terminal device and/or the network device may perform some or all of the operations in the embodiments. These operations or operations are merely examples. In the embodiments of this application, other operations or variations of various operations may be performed. In addition, the operations may be performed in different orders presented in the embodiments, and not all operations in the embodiments of this application may be performed. Sequence numbers of the foregoing operations do not indicate an execution sequence. The execution sequence of the operations should be determined based on functions and internal logic of the operations, and should not be construed as any limitation on the implementation process of this embodiment of this application.

Figure 8:
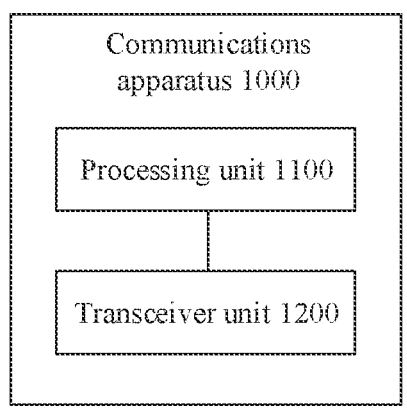
FIG. 8 is a schematic block diagram of a communications apparatus according to an embodiment of this application.

FIG. 8 is a schematic block diagram of a communications apparatus according to an embodiment of this application. As shown in FIG. 8, the communications apparatus 1000 may include a processing unit 1100 and a transceiver unit 1200.

In a possible design, the communications apparatus 1000 may correspond to the terminal device in the foregoing method embodiments, for example, may be a terminal device, or a component (such as a circuit or a chip) disposed in the terminal device.

It should be understood that the communications apparatus 1000 may correspond to the terminal device in the method 200 or the method 700 according to the embodiments of this application, and the communications apparatus 1000 may include units configured to perform the method performed by the terminal device in the method 200 in FIG. 2 or the method 700 in FIG. 7. In addition, the units in the communications apparatus 1000 and the foregoing other operations and/or functions are separately intended to implement corresponding procedures of the method 200 in FIG. 2 or the method 700 in FIG. 7.

The processing unit 1100 is configured to generate first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and the transceiver unit 1200 is configured to send the first indication information and the second indication information.

Optionally, the plurality of frequency domain component vectors are continuous, the first indication information is used to indicate a start position $K_2$ of the plurality of frequency domain component vectors and a quantity $M_2$ of the plurality of frequency domain component vectors, $K_2$ is an integer greater than or equal to 0, and $M_2$ is an integer greater than or equal to 2.

Optionally, in the first indication information, a quantity of bits occupied to indicate the start position of the plurality of frequency domain component vectors is $\lceil \log_2 M_2 \rceil$, and a frequency domain component vector corresponding to a strongest spatial-frequency component vector corresponding to each spatial layer is always a first frequency domain component vector in a candidate frequency domain component vector sequence.

Optionally, if $K_2+M_2 \leq N_F$, indexes of the plurality of frequency domain component vectors are $K_2$ to $K_2+M_2-1$; or if $K_2+M_2 > N_F$, indexes of the plurality of frequency domain component vectors are $K_2$ to $N_F-1$ and 0 to $(K_2+M_2-1) \bmod N_F$, where $N_F$ is a quantity of candidate frequency domain component vectors, $N_F$ is an integer greater than or equal to 2, and the plurality of frequency domain component vectors are selected from the $N_F$ candidate frequency domain component vectors.

Optionally, each piece of second indication information is used to indicate a plurality of groups of at least one continuous frequency domain component vector.

Optionally, each piece of second indication information includes second position indication information and a plurality of pieces of second sub indication information, the second position indication information is used to indicate a plurality of start positions of the plurality of groups of at least one continuous frequency domain component vector, and each piece of second sub indication information in the plurality of pieces of second sub indication information is used to indicate a quantity of at least one continuous frequency domain component vector in each of the plurality of groups of at least one continuous frequency domain component vector.

Optionally, the processing unit 1100 is further configured to generate third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer, and the transceiver unit 1200 is further configured to send the third indication information and the plurality of pieces of fourth indication information.

Optionally, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

Optionally, if $K_1+M_1 \leq N_s$, indexes of the plurality of spatial domain component vectors are $K_1$ to $K_1+M_1-1$; or if $K_1+M_1 > N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

Optionally, each piece of fourth indication information includes a plurality of pieces of fourth sub indication information, and each piece of fourth indication information is used to indicate a plurality of groups of at least one continuous spatial domain component vector.

Optionally, each piece of fourth indication information includes fourth position indication information and a plurality of pieces of fourth sub indication information, the fourth position indication information is used to indicate a plurality of start positions of the plurality of groups of at least one continuous fourth domain component vector, and each piece of fourth sub indication information in the plurality of pieces of fourth sub indication information is used to indicate a quantity of at least one continuous spatial domain component vector in each of the plurality of groups of at least one continuous spatial domain component vector.

Optionally, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

Figure 9:
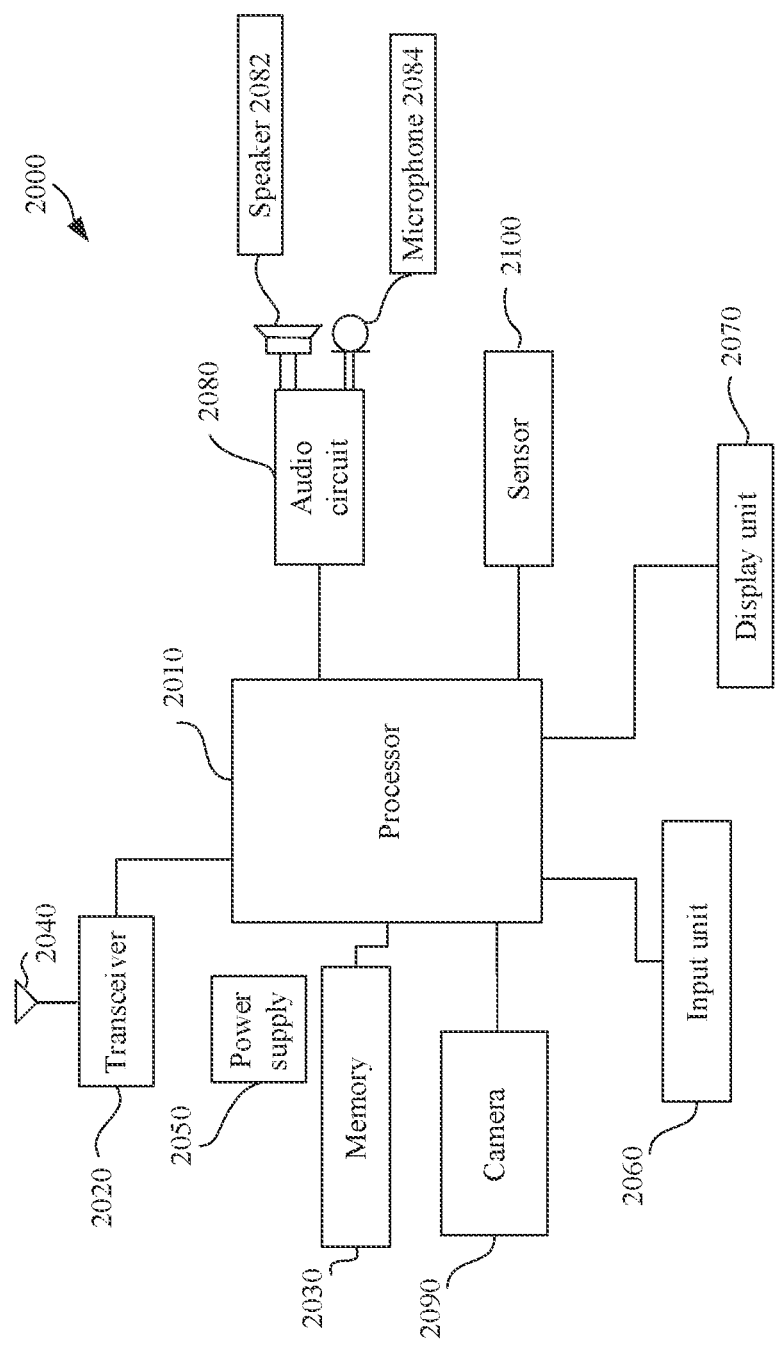
FIG. 9 is a schematic diagram of a structure of a terminal device according to an embodiment of this application.

It should be further understood that when the communications apparatus 1000 is a terminal device, the transceiver unit 1200 in the communications apparatus 1000 may be implemented by using a transceiver, for example, may correspond to a transceiver 2020 in a terminal device 2000 shown in FIG. 9, and the processing unit 1100 in the communications apparatus 1000 may be implemented by using at least one processor, for example, may correspond to a processor 2010 in the terminal device 2000 shown in FIG. 9.

It should be further understood that when the communications apparatus 1000 is a chip disposed in the terminal device, the transceiver unit 1200 in the communications apparatus 1000 may be implemented by using an input/output interface. In another possible design, the communications apparatus 1000 may correspond to the network device in the foregoing method embodiments, for example, may be a network device, or a component (such as a circuit or a chip) disposed in the network device.

In another possible design, the communications apparatus 1000 may correspond to the network device in the method 200 or the method 700 according to the embodiments of this application, and the communications apparatus 1000 may include units configured to perform the method performed by the network device in the method 200 in FIG. 2 or the method 700 in FIG. 7. In addition, the units in the communications apparatus 1000 and the foregoing other operations and/or functions are separately intended to implement corresponding procedures of the method 200 in FIG. 2 or the method 700 in FIG. 7.

The transceiver unit 1200 is configured to receive first indication information and a plurality of groups of second indication information, where the first indication information is used to indicate a plurality of frequency domain component vectors, each group of second indication information in the plurality of groups of second indication information corresponds to one spatial layer and a plurality of spatial domain component vectors and is used to construct precoding vectors of the spatial layer in a plurality of frequency bands, each piece of second indication information in each group of second indication information corresponds to one spatial domain component vector in the plurality of spatial domain component vectors and is used to indicate at least one of the plurality of frequency domain component vectors that corresponds to the spatial domain component vector, the precoding vectors in the plurality of frequency bands are constructed by using a weighted sum of a plurality of spatial-frequency component vectors, and each spatial-frequency component vector in the plurality of spatial-frequency component vectors is constructed by using one spatial domain component vector in the plurality of spatial domain component vectors and one frequency domain component vector in at least one frequency domain component vector indicated by second indication information corresponding to the spatial domain component vector; and the processing unit 1100 is configured to determine precoding vectors of each spatial layer in a plurality of frequency bands based on the first indication information and the plurality of groups of second indication information.

Optionally, the plurality of frequency domain component vectors are continuous, the first indication information is used to indicate a start position $K_2$ of the plurality of frequency domain component vectors and a quantity $M_2$ of the plurality of frequency domain component vectors, $K_2$ is an integer greater than or equal to 0, and $M_2$ is an integer greater than or equal to 2.

Optionally, in the first indication information, a quantity of bits occupied to indicate the start position of the plurality of frequency domain component vectors is $\lceil \log_2 M_2 \rceil$, and a frequency domain component vector corresponding to a strongest spatial-frequency component vector corresponding to each spatial layer is always a first frequency domain component vector in a candidate frequency domain component vector sequence.

Optionally, if $K_2+M_2 \leq N_F$, indexes of the plurality of frequency domain component vectors are $K_2$ to $K_2+M_2-1$; or if $K_2+M_2>N_F$, indexes of the plurality of frequency domain component vectors are $K_2$ to $N_F-1$ and 0 to $(K_2+M_2-1) \bmod N_F$, where $N_F$ is a quantity of candidate frequency domain component vectors, $N_F$ is an integer greater than or equal to 2, and the plurality of frequency domain component vectors are selected from the $N_F$ candidate frequency domain component vectors.

Optionally, each piece of second indication information includes a plurality of pieces of second sub indication information, and each piece of second indication information is used to indicate a plurality of groups of at least one continuous frequency domain component vector.

Optionally, each piece of second indication information includes second position indication information and a plurality of pieces of second sub indication information, the second position indication information is used to indicate a plurality of start positions of the plurality of groups of at least one continuous frequency domain component vector, and each piece of second sub indication information in the plurality of pieces of second sub indication information is used to indicate a quantity of at least one continuous frequency domain component vector in each of the plurality of groups of at least one continuous frequency domain component vector.

Optionally, the transceiver unit 1200 is further configured to receive third indication information and a plurality of pieces of fourth indication information, where the third indication information is used to indicate a plurality of spatial domain component vectors, each piece of fourth indication information in the plurality of pieces of fourth indication information corresponds to one spatial layer, and each piece of fourth indication information is used to indicate at least one of the plurality of spatial domain component vectors that corresponds to the spatial layer; and the processing unit 1100 is further configured to determine, based on the third indication information and the plurality of pieces of fourth indication information, at least one spatial domain component vector corresponding to each spatial layer.

Optionally, the plurality of spatial domain component vectors are continuous, the third indication information is used to indicate a start position $K_1$ of the plurality of spatial domain component vectors and a quantity $M_1$ of the plurality of spatial domain component vectors, $K_1$ is an integer greater than or equal to 0, and $M_1$ is an integer greater than or equal to 2.

Optionally, if $K_1+M_1 \leq N_s$, indexes of the plurality of spatial domain component vectors are $K_1$ to $K_1+M_1-1$; or if $K_1+M_1>N_s$, indexes of the plurality of spatial domain component vectors are $K_1$ to $N_s-1$ and 0 to $(K_1+M_1-1) \bmod N_s$, where $N_s$ is a quantity of candidate spatial domain component vectors, $N_s$ is an integer greater than or equal to 2, and the plurality of spatial domain component vectors are selected from the $N_s$ candidate spatial domain component vectors.

Optionally, each piece of fourth indication information is used to indicate a plurality of groups of at least one continuous spatial domain component vector.

Optionally, each piece of fourth indication information includes fourth position indication information and a plurality of pieces of fourth sub indication information, the fourth position indication information is used to indicate a plurality of start positions of the plurality of groups of at least one continuous fourth domain component vector, and each piece of fourth sub indication information in the plurality of pieces of fourth sub indication information is used to indicate a quantity of at least one continuous spatial domain component vector in each of the plurality of groups of at least one continuous spatial domain component vector.

Optionally, a quantity of spatial domain component vectors indicated by each piece of fourth indication information is L, a quantity of the plurality of pieces of fourth sub indication information is a quantity of the plurality of start positions minus one, and L is a preconfigured or predefined integer greater than 1.

Figure 10:
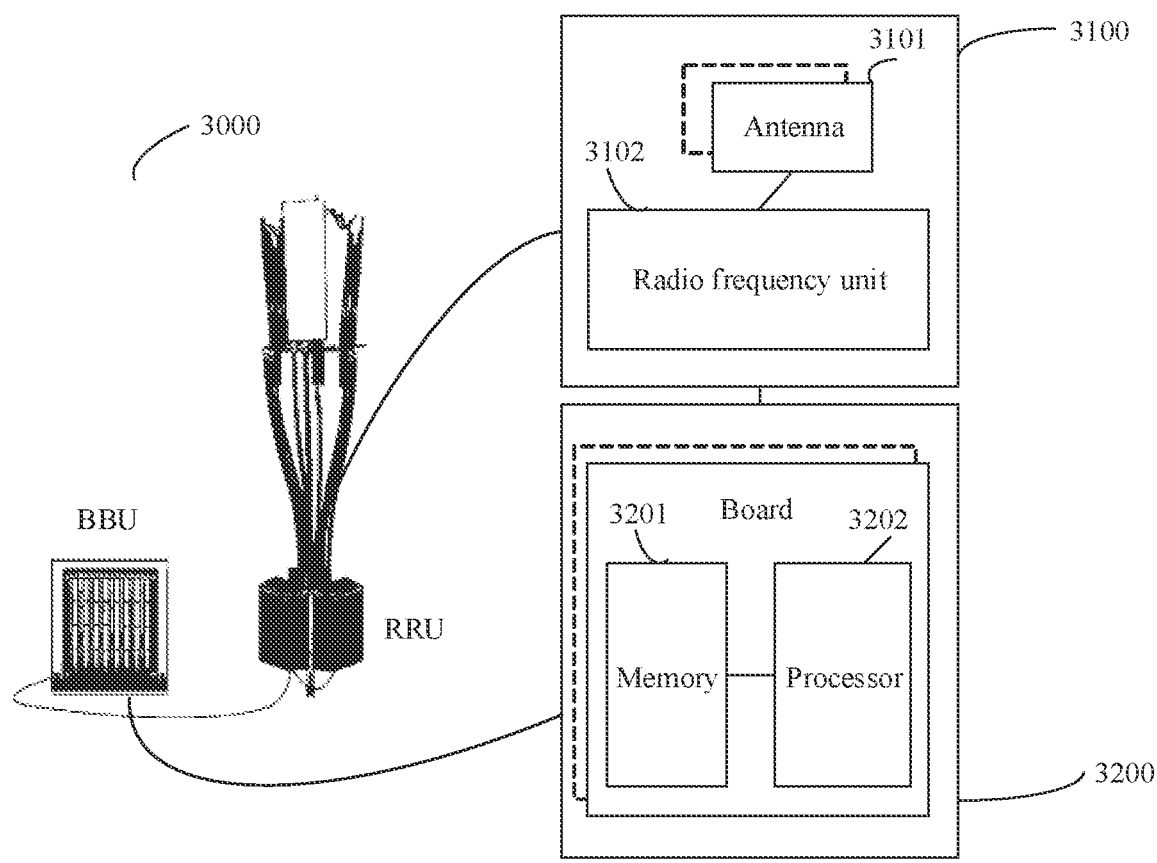
FIG. 10 is a schematic diagram of a structure of a network device according to an embodiment of this application.

It should be understood that when the communications apparatus 1000 is the network device, the transceiver unit in the communications apparatus 1000 may be implemented by using a transceiver, for example, may correspond to a transceiver 3100 in a network device 3000 shown in FIG. 10, and the processing unit 1100 in the communications apparatus 1000 may be implemented by using at least one processor, for example, may correspond to a processor 3200 in the network device 3000 shown in FIG. 10.

It should be further understood that when the communications apparatus 1000 is a chip disposed in the network device, the transceiver unit 1200 in the communications apparatus 1000 may be implemented by using an input/output interface.

FIG. 9 is a schematic diagram of a structure of the terminal device 2000 according to an embodiment of this application. The terminal device 2000 may be used in the system shown in FIG. 1, to perform a function of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored m the memory 2030 to implement the foregoing functions. During specific implementation, the memory 2030 may alternatively be integrated into the processor 2010, or may be independent of the processor 2010. The processor 2010 may correspond to the processing unit in FIG. 8.

The transceiver 2020 may correspond to the transceiver unit in FIG. 8, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 9 can implement the processes related to the terminal device in the method embodiment shown in FIG. 2 or FIG. 7. The operations and/or the functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 10 is a schematic diagram of a structure of a network device according to an embodiment of this application, for example, may be a schematic diagram of a structure of a base station. The base station 3000 may be used in the system shown in FIG. 1, to perform a function of the network device in the foregoing method embodiments. As shown in the figure, the base station 3000 may include one or more radio frequency units such as remote radio units (RRUs) 3100 and one or more baseband units (BBUs) (which may also be referred to as distributed units (DUs)) 3200. The RRU 3100 may be referred to as a transceiver unit, and corresponds to the transceiver unit 1200 in FIG. 8. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to receive and send a radio frequency signal, and perform conversion between the radio frequency signal and a baseband signal. For example, the RRU 3100 is configured to send indication information to a terminal device. The BBU 3200 is mainly configured to perform baseband processing, control the base station, and so on. The RRU 3100 and the BBU 3200 may be physically disposed together, or may be physically disposed separately, that is, the base station is a distributed base station.

The BBU 3200 is a control center of the base station, and may be referred to as a processing unit. The BBU may correspond to the processing unit 1100 in FIG. 8, and is mainly configured to implement a baseband processing function, for example, channel encoding, multiplexing, modulation, or frequency spread. For example, the BBU (the processing unit) may be configured to control the base station to perform an operation procedure related to the network device in the foregoing method embodiments, for example, to generate the foregoing indication information.

In an example, the BBU 3200 may include one or more boards. A plurality of boards may jointly support a radio access network (for example, an LTE network) of a single access standard, or may separately support radio access networks (for example, the LTE network, a 5G network, or another network) of different access standards. The BBU 3200 further includes a memory 3201 and a processor 3202. The memory 3201 is configured to store necessary instructions and data. The processor 3202 is configured to control the base station to perform a necessary action, for example, is configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It should be understood that the network device 3000 shown in FIG. 10 can implement each process related to the network device in the method embodiment shown in FIG. 2 or FIG. 7. The operations and/or the functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action implemented inside the network device in the foregoing method embodiments, and the RRU 3100 may be configured to perform an action of sending by the network device to the terminal device or receiving from the terminal device in the foregoing method embodiments. For details, refer to the descriptions in the foregoing method embodiments. Details are not described herein again.

It should be understood that, the base station 3000 shown in FIG. 10 is merely a possible architecture of the network device, and shall not constitute any limitation on this application. The method provided in this application is applicable to a network device of another architecture, for example, a network device including a CU, a DU, and an AAU. A specific architecture of the network device is not limited in this application.

An embodiment of this application further provides a processing apparatus, including a processor and an interface, where the processor is configured to perform any one of the foregoing method embodiments.

It should be understood that, the processing apparatus may be one or more chips. For example, the processing apparatus may be a field programmable gate array (FPGA), a dedicated integrated chip (ASIC), a system on chip (SoC), a central processing unit (CPU), a network processor (NP), a digital signal processor (DSP), a microcontroller unit (MCU), a programmable logic device (PLD), or another integrated chip.

In an implementation process, the operations in the foregoing methods can be implemented by using a hardware integrated logic circuit in the processor, or by using instructions in a form of software. The operations in the methods disclosed with reference to the embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the operations in the foregoing methods in combination with hardware of the processor. To avoid repetition, details are not described herein again.

It should be noted that the processor in the embodiments of this application may be an integrated circuit chip, and has a signal processing capability. In an implementation process, the operations in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and the logical block diagrams that are disclosed in the embodiments of this application. The general-purpose processor may be a microprocessor, or the processor may be any conventional processor or the like. The operations in the methods disclosed with reference to the embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the operations in the foregoing methods in combination with hardware of the processor.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and method described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in the embodiment shown in FIG. 2 or FIG. 7.

According to the method provided in the embodiments of this application, this application further provides a computer-readable medium. The computer-readable medium stores program code. When the program code is run on a computer, the computer is enabled to perform the method in the embodiment shown in FIG. 2 or FIG. 7.

According to the method provided in the embodiments of this application, this application further provides a system. The system includes one or more terminal devices described above and one or more network devices described above.

The network device and the terminal device in the foregoing apparatus embodiments completely correspond to the network device and the terminal device in the method embodiments. A corresponding module or unit performs a corresponding operation. For example, the communications unit (transceiver) performs a receiving or sending operation in the method embodiments, and an operation other than the sending operation and the receiving operation may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed on various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, various illustrative logical blocks and operations that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information reporting method, comprising:
   generating first indication information, a plurality of groups of second indication information, and a third indication information, wherein the first indication information indicates a plurality of frequency domain component vectors, wherein each group of the plurality of groups of second indication information corresponds to a spatial layer and a plurality of spatial domain component vectors, and is used to construct precoding vectors of the spatial layer in a plurality of frequency bands, wherein each piece of second indication information in each group corresponds to a spatial domain component vector in the plurality of spatial domain component vectors and indicates at least one of the plurality of frequency domain component vectors that corresponds to the spatial domain component vector, wherein the third indication information indicates the plurality of spatial domain component vectors, wherein the precoding vectors in the plurality of frequency bands are constructed by using a weighted sum of a plurality of spatial-frequency component vectors, wherein each spatial-frequency component vector in the plurality of spatial-frequency component vectors is constructed by using a spatial domain component vector in the plurality of spatial domain component vectors and a frequency domain component vector in at least one frequency domain component vector indicated by second indication information corresponding to the spatial domain component vector, wherein the first indication information indicates a start position $K_2$ of the plurality of frequency domain component vectors, and wherein the third indication information indicates a start position $K_1$ of the plurality of spatial domain component vectors; and sending the first indication information, the plurality of groups of second indication information, and the third indication information.

2. The method according to claim 1, wherein the plurality of frequency domain component vectors are continuous, and wherein the first indication information indicates a quantity $M_2$ of the plurality of frequency domain component vectors, $K_2$ is an integer greater than or equal to 0, and $M_2$ is an integer greater than or equal to 2.

3. The method according to claim 2, wherein in the first indication information, a quantity of bits occupied to indicate the start position $K_2$ of the plurality of frequency domain component vectors is $\lceil \log_2 M_2 \rceil$, and a frequency domain component vector corresponding to a strongest spatial-frequency component vector corresponding to each spatial layer is a first frequency domain component vector in a candidate frequency domain component vector sequence.

4. The method according to claim 2, further comprises:
in response to determining that $K_2+M_2 \leq N_F$, indexes of the plurality of frequency domain component vectors are $K_2$ to $K_2+M_2-1$; or
in response to determining that $K_2+M_2 > N_F$, indexes of the plurality of frequency domain component vectors are $K_2$ to $N_F-1$ and 0 to $(K_2+M_2-1) \bmod N_F$, wherein
$N_F$ is a quantity of candidate frequency domain component vectors, $N_F$ is an integer greater than or equal to 2, and the plurality of frequency domain component vectors are selected from the $N_F$ candidate frequency domain component vectors.

5. The method according to claim 1, wherein each piece of second indication information indicates a plurality of groups of at least one frequency domain component vector that is continuous.

6. The method according to claim 5, wherein each piece of second indication information comprises second position indication information and a plurality of pieces of second sub indication information, the second position indication information indicates a plurality of start positions of the plurality of groups of at least one frequency domain component vector that is continuous, and each piece of second sub indication information in the plurality of pieces of second sub indication information indicates a quantity of at least one frequency domain component vector in each of the plurality of groups of at least one frequency domain component vector.

7. The method according to claim 1, wherein the method further comprises:
generating a plurality of pieces of fourth indication information, wherein each piece of fourth indication information in the plurality of pieces of fourth indication information corresponds to a spatial layer, and each piece of fourth indication information indicates at least one of the plurality of spatial domain component vectors that corresponds to the spatial layer; and
sending the plurality of pieces of fourth indication information.

8. The method according to claim 7, wherein the plurality of spatial domain component vectors are continuous, the third indication information indicates a quantity $M_1$ of the plurality of spatial domain component vectors, $K_1$ is an integer greater than or equal to 0, and $M_1$ is an integer greater than or equal to 2.

9. The method according to claim 8, further comprises:
in response to determining that $K_1+M_1 \leq N_s$, indexes of the plurality of spatial domain component vectors are $K_1$ to $K_1+M_1-1$; or
in response to determining that $K_1+M_1 > N_s$, indexes of the plurality of spatial domain component vectors are $K_1$ to $N_s-1$ and 0 to $(K_1+M_1-1) \bmod N_s$, wherein
$N_s$ is a quantity of candidate spatial domain component vectors, $N_s$ is an integer greater than or equal to 2, and the plurality of spatial domain component vectors are selected from the $N_s$ candidate spatial domain component vectors.

10. A communications apparatus, comprising:
at least one transceiver;
at least one processor; and
one or more memories coupled to the at least one processor and storing programming instructions for execution by the at least one processor to cause the communications apparatus to:
generate first indication information, a plurality of groups of second indication information, and a third indication information, wherein the first indication information indicates a plurality of frequency domain component vectors, wherein each group in the plurality of groups of second indication information corresponds to a spatial layer and a plurality of spatial domain component vectors, and is used to construct precoding vectors of the spatial layer in a plurality of frequency bands, wherein each piece of second indication information in each group corresponds to a spatial domain component vector in the plurality of spatial domain component vectors and indicates at least one of the plurality of frequency domain component vectors that corresponds to the spatial domain component vector, wherein the third indication information indicates the plurality of spatial domain component vectors, wherein the precoding vectors in the plurality of frequency bands are constructed by using a weighted sum of a plurality of spatial-frequency component vectors, wherein each spatial-frequency component vector in the plurality of spatial-frequency component vectors is constructed by using a spatial domain component vector in the plurality of spatial domain component vectors and a frequency domain component vector in at least one frequency domain component vector indicated by second indication information corresponding to the spatial domain component vector, wherein the first indication information indicates a start position $K_2$ of the plurality of frequency domain component vectors, and wherein the third indication information indicates a start position $K_1$ of the plurality of spatial domain component vectors; and
send the first indication information, the plurality of groups of second indication information, and the third indication information.

11. The communications apparatus according to claim 10, wherein the plurality of frequency domain component vectors are continuous, and
wherein the first indication information indicates a quantity $M_2$ of the plurality of frequency domain component vectors, $K_2$ is an integer greater than or equal to 0, and $M_2$ is an integer greater than or equal to 2.

12. The communications apparatus according to claim 11, wherein in the first indication information, a quantity of bits occupied to indicate the start position $K_2$ of the plurality of frequency domain component vectors is $\lceil \log_2 M_2 \rceil$, and a frequency domain component vector corresponding to a strongest spatial-frequency component vector corresponding to each spatial layer is a first frequency domain component vector in a candidate frequency domain component vector sequence.

13. The communications apparatus according to claim 11, wherein in response to determining that $K_2+M_2 \leq N_F$, indexes of the plurality of frequency domain component vectors are $K_2$ to $K_2+M_2-1$; or
in response to determining that $K_2+M_2 > N_F$, indexes of the plurality of frequency domain component vectors are $K_2$ to $N_F-1$ and 0 to $(K_2+M_2-1) \mod N_F$, wherein
$N_F$ is a quantity of candidate frequency domain component vectors, $N_F$ is an integer greater than or equal to 2, and the plurality of frequency domain component vectors are selected from the $N_F$ candidate frequency domain component vectors.

14. The communications apparatus according to claim 10, wherein each piece of second indication information indicates a plurality of groups of at least one frequency domain component vector that is continuous.

15. The communications apparatus according to claim 14, wherein each piece of second indication information comprises second position indication information and a plurality of pieces of second sub indication information, the second position indication information indicates a plurality of start positions of the plurality of groups of at least one frequency domain component vector that is continuous, and each piece of second sub indication information in the plurality of pieces of second sub indication information indicates a quantity of at least one frequency domain component vector in each of the plurality of groups of at least one frequency domain component vector.

16. The communications apparatus according to claim 10, wherein the programming instructions further cause the communications apparatus to:
generate a plurality of pieces of fourth indication information, wherein each piece of fourth indication information in the plurality of pieces of fourth indication information corresponds to a spatial layer, and each piece of fourth indication information indicates at least one of the plurality of spatial domain component vectors that corresponds to the spatial layer; and
send the plurality of pieces of fourth indication information.

17. The communications apparatus according to claim 16, wherein the plurality of spatial domain component vectors are continuous, the third indication information indicates a quantity $M_1$ of the plurality of spatial domain component vectors, $K_1$ is an integer greater than or equal to 0, and $M_1$ is an integer greater than or equal to 2.

18. The communications apparatus according to claim 17, wherein in response to determining that $K_1+M_1 \leq N_s$, indexes of the plurality of spatial domain component vectors are $K_1$ to $K_1+M_1-1$; or
in response to determining that $K_1+M_1 > N_s$, indexes of the plurality of spatial domain component vectors are $K_1$ to $N_s-1$ and 0 to $(K_1+M_1-1) \mod N_s$, wherein
$N_s$ is a quantity of candidate spatial domain component vectors, $N_s$ is an integer greater than or equal to 2, and the plurality of spatial domain component vectors are selected from the $N_s$ candidate spatial domain component vectors.

19. A non-transitory computer-readable medium storing one or more programming instructions executable by at least one processor to cause the at least one processor to execute:
generating first indication information, a plurality of groups of second indication information, and a third indication information, wherein the first indication information indicates a plurality of frequency domain component vectors, wherein each group of the plurality of groups of second indication information corresponds to a spatial layer and a plurality of spatial domain component vectors, and is used to construct precoding vectors of the spatial layer in a plurality of frequency bands, wherein each piece of second indication information in each group corresponds to a spatial domain component vector in the plurality of spatial domain component vectors and indicates at least one of the plurality of frequency domain component vectors that corresponds to the spatial domain component vector, wherein the third indication information indicates the plurality of spatial domain component vectors, wherein the precoding vectors in the plurality of frequency bands are constructed by using a weighted sum of a plurality of spatial-frequency component vectors, wherein each spatial-frequency component vector in the plurality of spatial-frequency component vectors is constructed by using a spatial domain component vector in the plurality of spatial domain component vectors and a frequency domain component vector in at least one frequency domain component vector indicated by second indication information corresponding to the spatial domain component vector, wherein the first indication information indicates a start position $K_2$ of the plurality of frequency domain component vectors, and wherein the third indication information indicates a start position $K_1$ of the plurality of spatial domain component vectors; and
sending the first indication information, the plurality of groups of second indication information, and the third indication information.

20. The non-transitory computer-readable medium according to claim 19, wherein the plurality of frequency domain component vectors are continuous, and wherein the first indication information indicates a quantity $M_2$ of the plurality of frequency domain component vectors, $K_2$ is an integer greater than or equal to 0, and $M_2$ is an integer greater than or equal to 2.

* * * * *